(12) United States Patent
Chino et al.

(10) Patent No.: US 9,022,588 B2
(45) Date of Patent: May 5, 2015

(54) MIRROR SURFACE ANGLE ADJUSTING DEVICE

(75) Inventors: Masaru Chino, Kiryu (JP); Tetsuya Murakoshi, Kiryu (JP); Hiroshi Morishita, Kiryu (JP); Osamu Ichikawa, Kiryu (JP)

(73) Assignee: Mitsuba Corporation, Kiryu-shi (JP)

( * ) Notice: Subject to any disclaimer, the term of this patent is extended or adjusted under 35 U.S.C. 154(b) by 64 days.

(21) Appl. No.: 13/503,895

(22) PCT Filed: Nov. 2, 2010

(86) PCT No.: PCT/JP2010/069480
§ 371 (c)(1),
(2), (4) Date: Apr. 25, 2012

(87) PCT Pub. No.: WO2011/058907
PCT Pub. Date: May 19, 2011

(65) Prior Publication Data
US 2012/0218657 A1    Aug. 30, 2012

(30) Foreign Application Priority Data

Nov. 10, 2009  (JP) .................................. 2009-257144
Nov. 10, 2009  (JP) .................................. 2009-257145
Nov. 10, 2009  (JP) .................................. 2009-257146

(51) Int. Cl.
*G02B 7/182*   (2006.01)
*B60R 1/072*   (2006.01)
*G02B 7/198*   (2006.01)

(52) U.S. Cl.
CPC ................ *B60R 1/072* (2013.01); *G02B 7/198* (2013.01)

(58) Field of Classification Search
CPC .......... G02B 7/198; B60R 1/06; B60R 1/066; B60R 1/07

USPC .......................................... 359/841, 871–877
See application file for complete search history.

(56) References Cited

U.S. PATENT DOCUMENTS

| 4,877,214 A | 10/1989 | Toshiaki et al. |
| 2006/0181793 A1* | 8/2006 | Ishikawa ....................... 359/877 |
| 2008/0043354 A1* | 2/2008 | Fukai et al. ................... 359/877 |

FOREIGN PATENT DOCUMENTS

| CN | 1576104 | 2/2005 |
| CN | 1820981 | 8/2006 |

(Continued)

OTHER PUBLICATIONS

European Search Report for EP 10 829 867, dated Apr. 4, 2013.

(Continued)

*Primary Examiner* — Suchin Parihar
*Assistant Examiner* — Collin X Beatty
(74) *Attorney, Agent, or Firm* — Kenyon & Kenyon LLP

(57) ABSTRACT

A mirror surface angle adjusting device includes: a pivot plate (10) which supports a mirror (6) and is attached to a holder (9) pivotably three-dimensionally on a pivot shaft (76); a bracket (8) disposed on a vehicle body; a mirror tilting drive section (11) contained between the bracket (8) and the holder (9) attached to the bracket (8); an operation shaft (44A, 44B) of the mirror tilting drive section (11), the operation shaft penetrating through the holder (9) and being connected to the pivot plate (10); a detection rod (101A, 101B) which moves following the pivot plate (10); an angle detection section (100) which detects a tilt angle of the pivot plate (10); a pivot depressed portion (80) into which the pivot shaft can be press-fitted; and a gear positioning rib (69) provided on an inner wall of the holder (9) to position the mirror tilting drive section (42).

8 Claims, 16 Drawing Sheets

(56) References Cited

FOREIGN PATENT DOCUMENTS

| | | |
|---|---|---|
| EP | 0 090 909 | 10/1983 |
| EP | 1300289 | 4/2003 |
| JP | 63-189749 | 12/1988 |
| JP | 1-95452 | 6/1989 |
| JP | 2-290753 | 11/1990 |
| JP | 6-30563 | 8/1994 |
| JP | 2001-080417 | 3/2001 |
| JP | 2001-322497 | 11/2001 |
| JP | 2005-028957 | 2/2005 |
| JP | 2005-297630 | 10/2005 |
| JP | 2007-168610 | 7/2007 |

OTHER PUBLICATIONS

Office Action dated Dec. 20, 2013 in corresponding application CN No. 201080050521.8.

International Search Report issued on the underlying PCT/JP2010/069480 with English translation thereof.

\* cited by examiner

MIRROR SURFACE ANGLE ADJUSTING DEVICE

TECHNICAL FIELD

The present invention relates to a mirror surface angle adjusting device that adjusts an angle of a mirror surface of a vehicle mirror device. Priority is claimed on Japanese Patent Application Nos. 2009-257144, 2009-257145, and 2009-257146 filed Nov. 10, 2009, the contents of which are incorporated herein by reference.

BACKGROUND ART

For example, a vehicle door mirror device is configured so that an angle of a mirror surface of a mirror arranged in an opening of a mirror housing can be adjusted vertically and horizontally by operating a switch arranged near a driver's seat in the vehicle interior.

As a conventional mirror surface angle adjusting device, there has been proposed one in which, a bracket for fitting a mirror housing to a door, and a mirror surface angle adjusting drive unit that houses a driving section (motor, a worm wheel gear, and the like) that adjusts an angle of a mirror surface, are assembled in a two-piece type case like a wafer cake (a hamburger) in separate lines, after which the mirror surface angle adjusting drive unit is assembled to the bracket (for example, refer to Patent Document 1).

On the other hand, such a mirror surface angle adjusting device has been recently devised that can detect an angle of a mirror surface set by the mirror surface angle adjusting device by a position detecting unit, and stores the angle of the mirror surface set for each driver beforehand in a storage unit, and when one is selected from the stored plurality of angles of the mirror surface, automatic adjustment to the selected angle of the mirror surface is performed.

Therefore, there have been proposed, as the mirror surface angle adjusting device, (1) one in which a position detecting unit is unitized separately from a mirror surface angle adjusting unit and attached to the mirror surface angle adjusting unit (for example, refer to Patent Document 2), (2) one in which a position detecting unit is built into a mirror surface angle adjusting unit together with an angle adjusting unit (for example, refer to Patent Document 3), and (3) one in which a position detecting unit is assembled in an angle adjusting unit of a mirror surface angle adjusting unit (for example, refer to Patent Document 4).

Moreover, as a conventional mirror surface angle adjusting device, there has been proposed one in which there is provided a mirror surface angle adjusting unit attached to a bracket, a pivot plate tiltably attached to a front holder, and a mirror attached to the pivot plate, and a pivot section that tiltably connects the front holder and the pivot plate is threadably mounted so as not to come off (for example, refer to Patent Document 5).

As an assembly procedure of the conventional mirror surface angle adjusting device configured as described above, the mirror surface angle adjusting unit is assembled beforehand, the mirror surface angle adjusting unit is attached to the bracket, and the pivot plate is attached to the mirror surface angle adjusting unit. Furthermore, at the time of assembling the mirror surface angle adjusting unit, a drive member is positioned and housed in a rear holder provided with a drive-member positioning rib, and the front holder is placed thereon from above, to connect the rear holder and the front holder together.

PRIOR ART DOCUMENTS

Patent Documents

[Patent Document 1]: Japanese Unexamined Patent Application, First Publication No. 2001-322497
[Patent Document 2]: Japanese Unexamined Patent Application, First Publication No. 2001-80417
[Patent Document 3]: Japanese Unexamined Patent Application, First Publication No. 2005-28957
[Patent Document 4]: Japanese Unexamined Patent Application, First Publication No. 2005-297630
[Patent Document 5]: Japanese Examined Utility Model Application, Second Publication No. H 6-30563

DISCLOSURE OF INVENTION

Problems to be Solved by the Invention

However, in the conventional configuration, the case constituting an outer frame of the mirror surface angle adjusting drive unit is a two-piece type, and this case is attached to the bracket, thereby causing a problem in that the number of parts increases. Moreover, there is another problem in that productivity is poor because the bracket and the mirror surface angle adjusting drive unit are assembled in separate assembly lines.

Furthermore, in the mirror surface angle adjusting device described in Patent Document 1, because the position detecting unit is unitized separately from the angle adjusting unit, the number of parts increases, and assembly man-hours increase, thereby causing a cost increase.

Moreover, in the mirror surface angle adjusting devices described in Patent Documents 2 and 3, because the position detecting unit is built into the mirror surface angle adjusting drive unit, the number of parts can be reduced as compared to the one described in Patent Document 1. However, a basic configuration of the mirror surface angle adjusting device is such that the mirror surface angle adjusting drive unit assembled beforehand is attached to the bracket, and the case constituting an outer frame of the mirror surface angle adjusting drive unit is a two-piece type. Hence, the number of parts increases and the assembly man-hours also increases.

Furthermore, in order to reduce the number of parts, there has been considered one having a configuration in which a bracket and a rear holder are integrated as one part, a pivot shaft is provided in a protruding condition on an external wall of a front holder, a pivot recess into which a pivot shaft can be fitted is provided on a rear surface of the pivot plate, and the pivot shaft is press-fitted into the pivot recess, thereby connecting the pivot plate to the front holder tiltably.

When the mirror surface angle adjusting device is configured as described above, a press-fit process for press-fitting the pivot shaft on the front holder into the pivot recess in the pivot plate is required. However, if the press-fit load is large, it is necessary to place the pivot plate having the pivot recess at the bottom, mount the front holder having the pivot shaft on top of it, and press these together.

Furthermore, when the productivity of the mirror surface angle adjusting device is taken into consideration, it is preferable that there is no reversing process at the time of assembly. To achieve this, a method can be considered in which the pivot plate is placed at the bottom, the front holder is arranged thereon, a drive section such as a motor is housed inside the front holder, the rear holder integrated with the bracket is arranged thereon, and these are pressed from above in this state, thereby press-fitting the pivot shaft on the front holder into the pivot recess in the pivot plate.

However, in the conventional front holder, a rib for positioning the drive section is not provided. Consequently, at the time of housing the drive section in the front holder, misregistration of the drive section cannot be prevented. Thus if the drive section is not arranged at the right position, the rear holder cannot be properly overlapped on the front holder.

Means for Solving the Problems

In view of the above situation, the present invention provides a mirror surface angle adjusting device that can reduce the number of parts, simplify assembly, facilitate parts management, and improve productivity.

In the mirror surface angle adjusting device according to the present invention, the following means are adopted to solve the above problems.

A first aspect of the present invention is a mirror surface angle adjusting device in which a pivot plate supporting a mirror is attached to a holder so as to be able to pivot three-dimensionally about a pivot section, the holder is attached to a bracket installed on a vehicle body, a mirror tilting drive section is housed between the bracket and the holder, and an operation shaft for the mirror tilting drive section penetrates through the holder and is connected to the pivot plate.

According to the above configuration, the mirror tilting drive section is housed between the holder and the bracket, and the holder is directly attached to the bracket. As a result, the number of parts can be reduced. Moreover, assembly of the holder and the bracket can be performed in the same assembly line.

A second aspect of the present invention is a mirror surface angle adjusting device in which in the above-described first aspect, the mirror tilting drive section includes two operation shafts, and the holder includes a plurality of fitting portions for the bracket, the holder forming an elevation angle of about 45 degrees with respect to a horizontal reference line of the bracket. Moreover, the two operation shafts of the mirror tilting drive section are arranged at line-symmetric positions to each other with respect to a virtual reference line passing through a pivot point formed by the pivot section, and the plurality of fitting portions are arranged at line-symmetric positions with respect to the virtual reference line.

According to the above configuration, when left and right door mirror devices are installed at bilaterally symmetric positions in a vehicle body, for example, as in a vehicle door mirror device, by just shifting a fitting angle of the holder with respect to the bracket by 90 degrees, the holder can be used for left and right sides, and the holder can be manufactured as left and right common components.

A third aspect of the present invention is a mirror surface angle adjusting device in which in the above aspects, a distance of each operation shaft from the pivot center and a distance of each detection rod from the pivot center are the same.

According to the above configuration, by sharing a connecting section of the operation shaft and a connecting section of the detection rod in the pivot plate, then for example, as in the vehicle door mirror device, when left and right mirror devices are installed at bilaterally symmetric positions in the vehicle body, the pivot plate can be manufactured as left and right common components.

A fourth aspect of the present invention is a mirror surface angle adjusting device that includes: a bracket attached to a vehicle body; a holder attached to the bracket; a mirror tilting drive section housed between the bracket and the holder; a pivot plate having a pivot recess, into which a pivot shaft provided on an external surface of the holder can be press-fitted, and capable of pivoting three-dimensionally with respect to the holder in a state with the pivot shaft being press-fitted into the pivot recess; a mirror supported by the pivot plate; an operation shaft for the mirror tilting drive section, wherein the operation shaft penetrates through the holder, advances and retreats, and is connected to the pivot plate at an end thereof; and a positioning rib provided on an inner wall of the holder to position the mirror tilting drive section.

According to the above configuration, because the mirror tilting drive section is housed between the holder and the bracket, and the holder is directly attached to the bracket, the number of parts can be reduced. Moreover, at the time of assembling the mirror surface angle adjusting device, the pivot plate is placed at the bottom, the holder is arranged thereon, the mirror tilting drive section is housed inside the holder, and the bracket is arranged thereon. In this state, pressure is applied from above, to press-fit the pivot shaft on the holder into the pivot recess in the pivot plate, thereby enabling to assemble the mirror surface angle adjusting device. As a result, the holder, the bracket, and the pivot plate can be assembled on the same assembly line.

When the mirror tilting drive section is housed in the holder, the mirror tilting drive section can be positioned at a correct position with respect to the holder, because the positioning rib is provided on the inner wall of the holder, thereby enabling to prevent misregistration of the mirror tilting drive section during assembly.

A fifth aspect of the present invention includes a temporary positioning rib for temporarily positioning the mirror tilting drive section on the inner wall of the bracket.

According to the above configuration, as described above, positioning of the mirror tilting drive section with respect to the bracket can be performed simultaneously at the time of assembling the mirror surface angle adjusting device.

Effect of the Invention

According to the present invention, because the number of parts can be reduced, cost reduction can be achieved. Moreover, because the holder and the bracket can be assembled on the same assembly line, assembly can be simplified.

According to the present invention, because the holder can be manufactured as left and right common components, parts management can be facilitated, and hence, productivity can also be improved.

According to the present invention, because the pivot plate can be manufactured as left and right common components, parts management can be facilitated, and hence, productivity can also be improved.

According to the present invention, in an assembly process of the mirror surface angle adjusting device, misregistration of the mirror tilting drive section can be prevented, thereby improving assemblability.

According to the present invention, positioning of the mirror tilting drive section with respect to the holder and positioning thereof with respect to the bracket can be performed simultaneously.

EMBODIMENTS OF THE INVENTION

First Embodiment

Hereunder, a mirror surface angle adjusting device of a first embodiment according to the present invention will be explained, with reference to FIG. 1 to FIG. 11. In the explanation below, unless otherwise specified, the front and back direction corresponds to the front and back direction of the vehicle body, and the horizontal direction corresponds to the left and right direction when a passenger faces the front.

Figure 1:
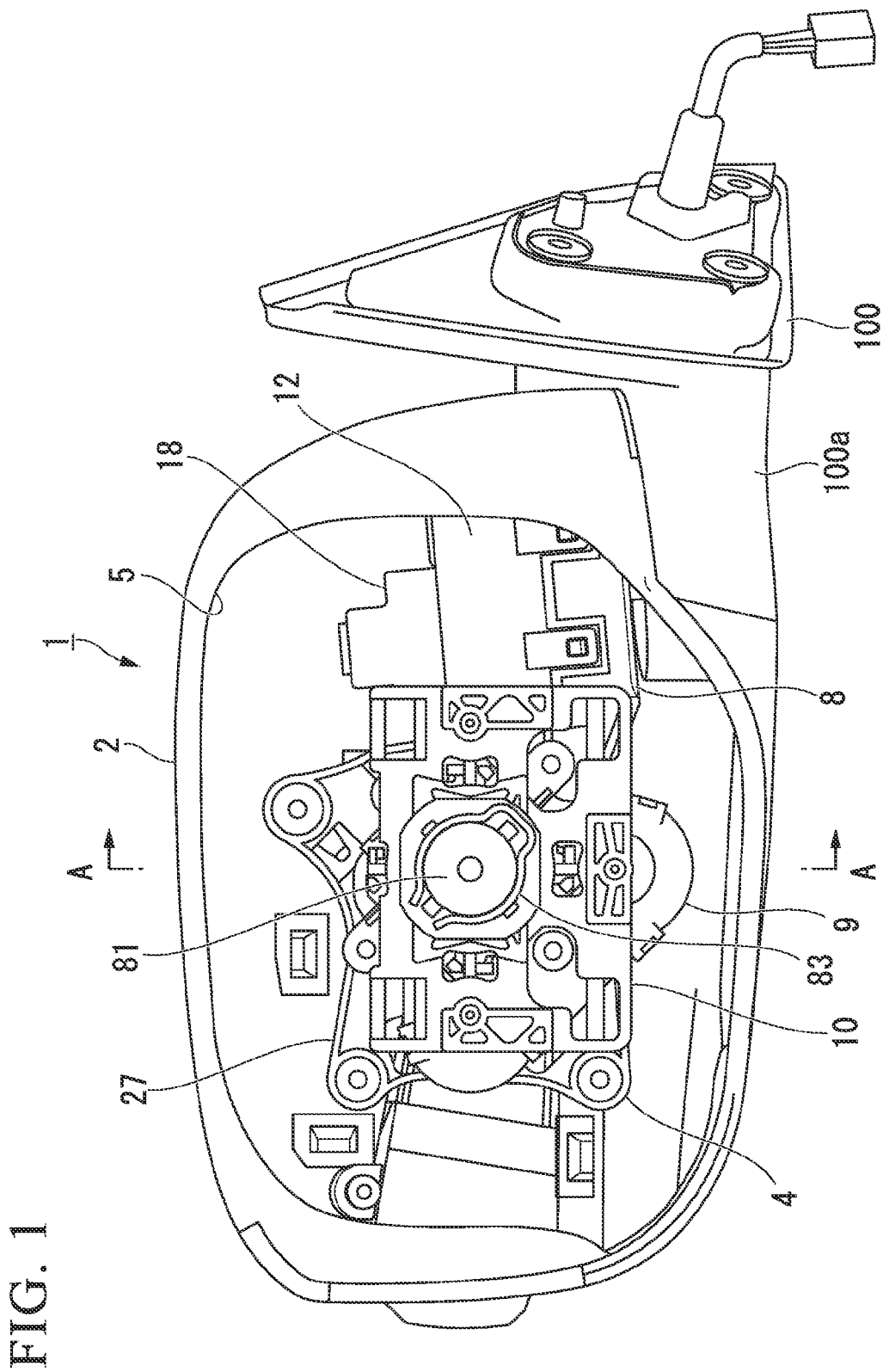
FIG. 1 is a front view of a door mirror device for a vehicle left door provided with a mirror surface angle adjusting device according to a first embodiment and a third embodiment.

FIG. 1 is a front view of a door mirror device 1 attached to a left door for a front seat (not shown) of a car (vehicle). The door mirror device 1 is installed on an arm 100a of a door mirror stay 100 fixed to the door so as to be able to open and close in the vehicle width direction. Moreover, the door mirror device 1 can be rotated in a direction approaching the door (a closing direction) and housed, or in a direction away from the door (an opening direction) so as to view rearward, by operating a switch (not shown) near the driver's seat in the vehicle interior, or by operating a hand-held remote control switch (not shown).

Figure 2:
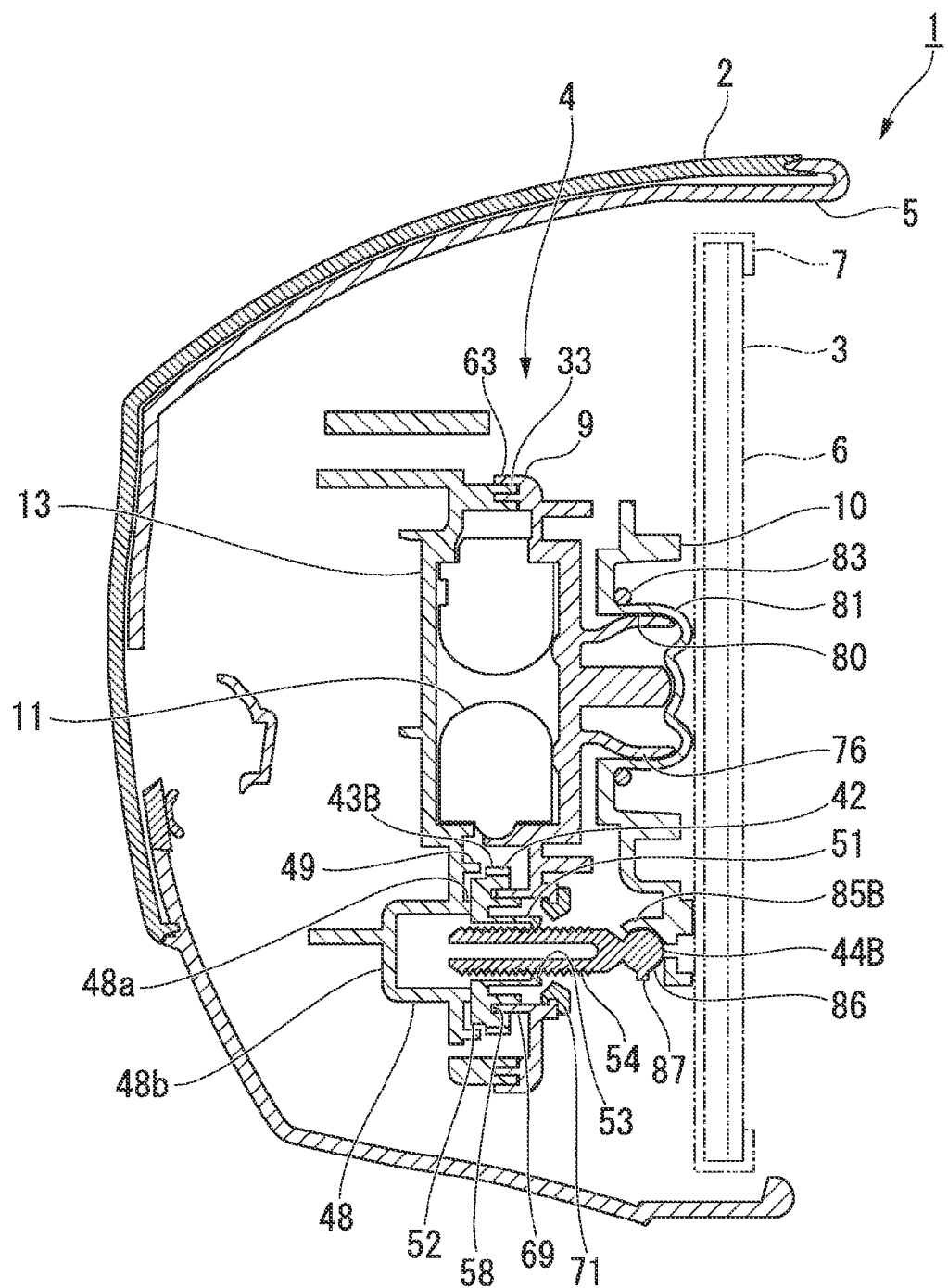
FIG. 2 is a sectional view along line A-A in FIG. 1.

As shown in FIG. 2, the door mirror device 1 includes; a mirror housing 2, a mirror unit 3, and a drive unit 4 that rotatably supports the mirror housing 2 with respect to the door and tiltably supports the mirror unit 3. In the present embodiment, the mirror surface angle adjusting device is incorporated in the drive unit 4 as a part of the drive unit 4.

The mirror housing 2 is made of resin and has a cup shape with the rear side being opened. Moreover, the mirror unit 3 is arranged in the mirror housing 2 at a position close to an opening 5. The mirror unit 3 is constituted by a mirror 6 and a mirror holder 7 that supports the mirror 6, and the mirror holder 7 is configured so as to be tiltable by the drive unit 4.

Figure 3:
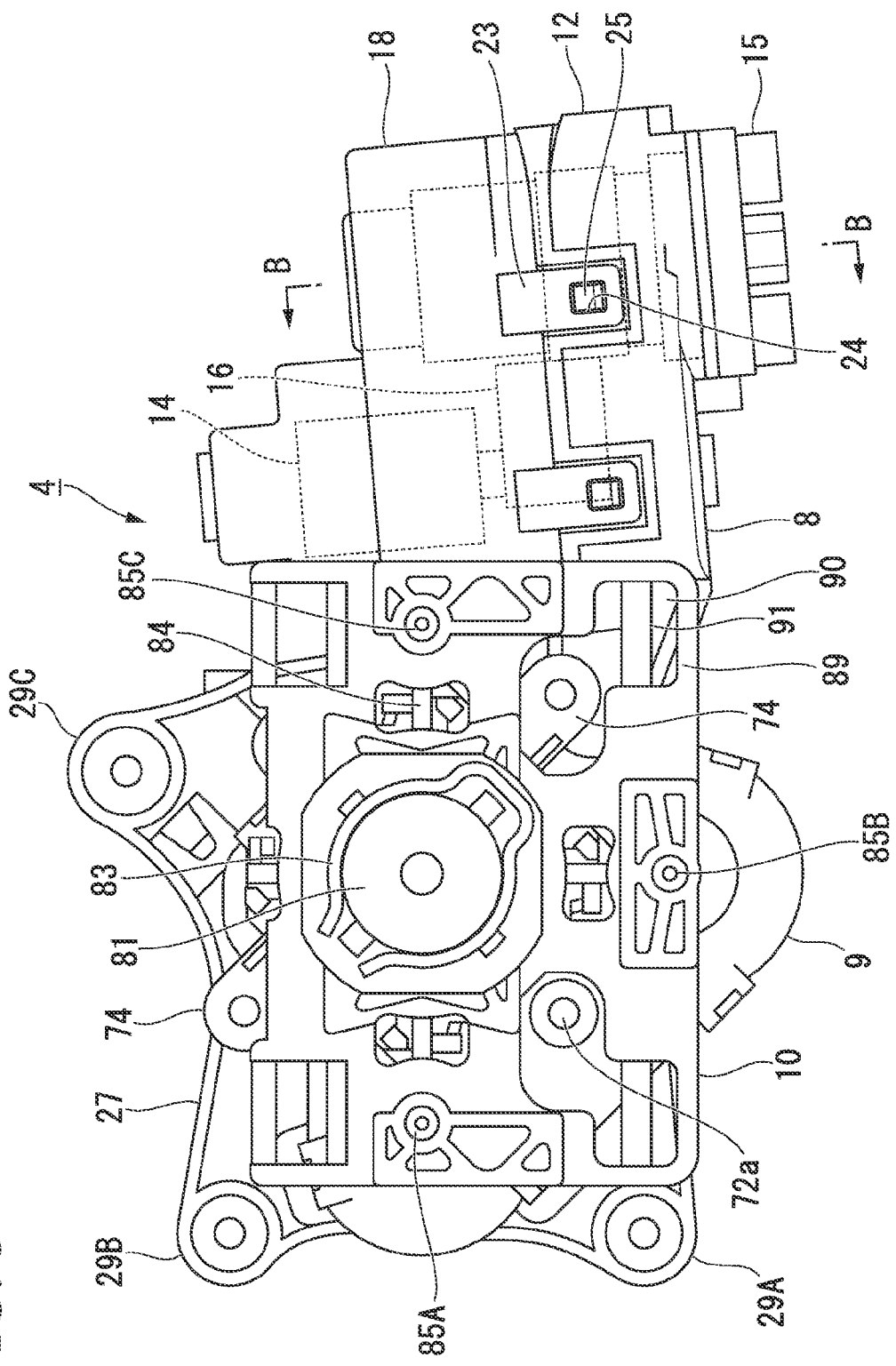
FIG. 3 is a front view of a drive unit in the door mirror device.
Figure 5:
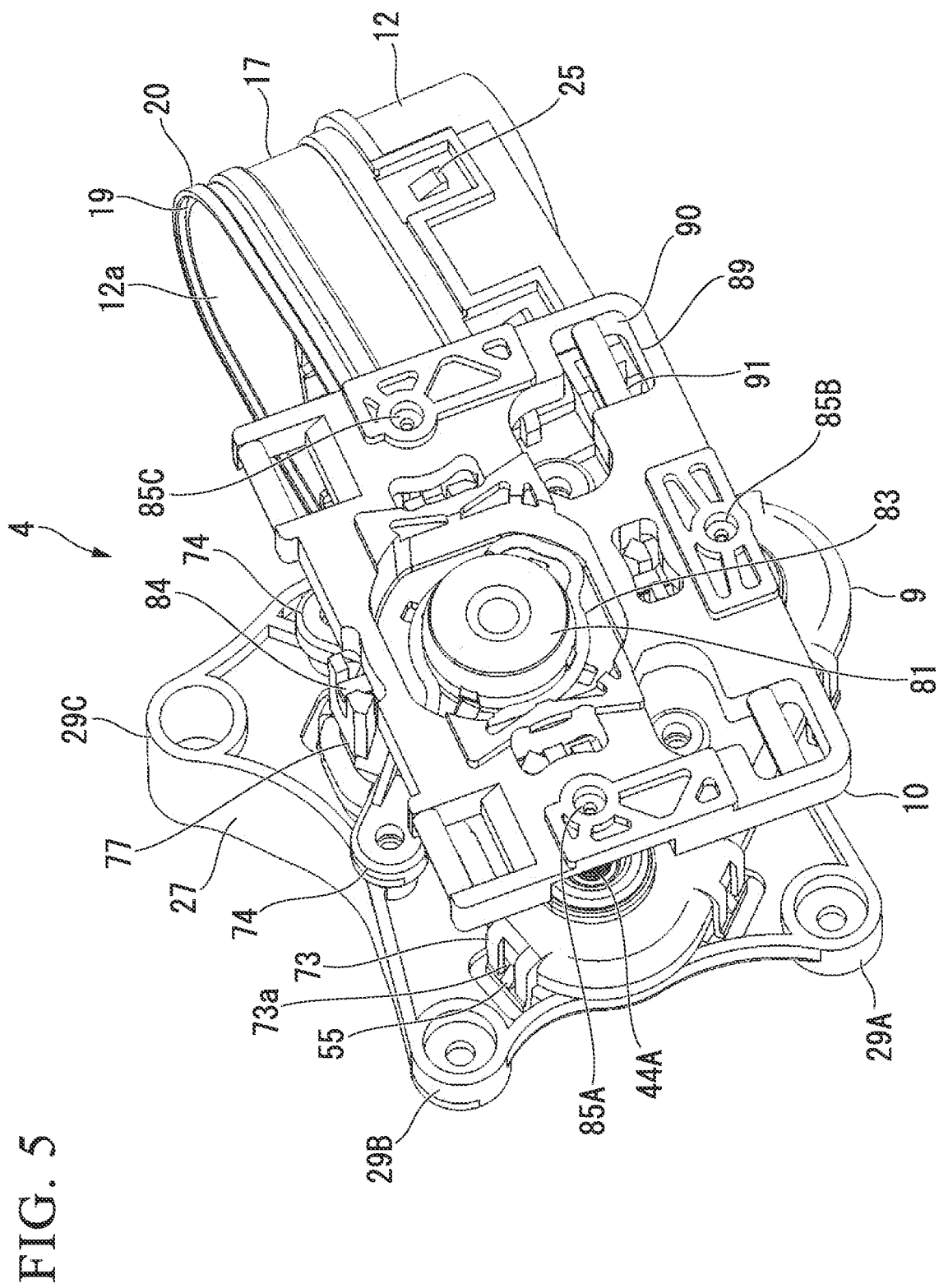
FIG. 5 is a perspective view of the drive unit.
Figure 6:
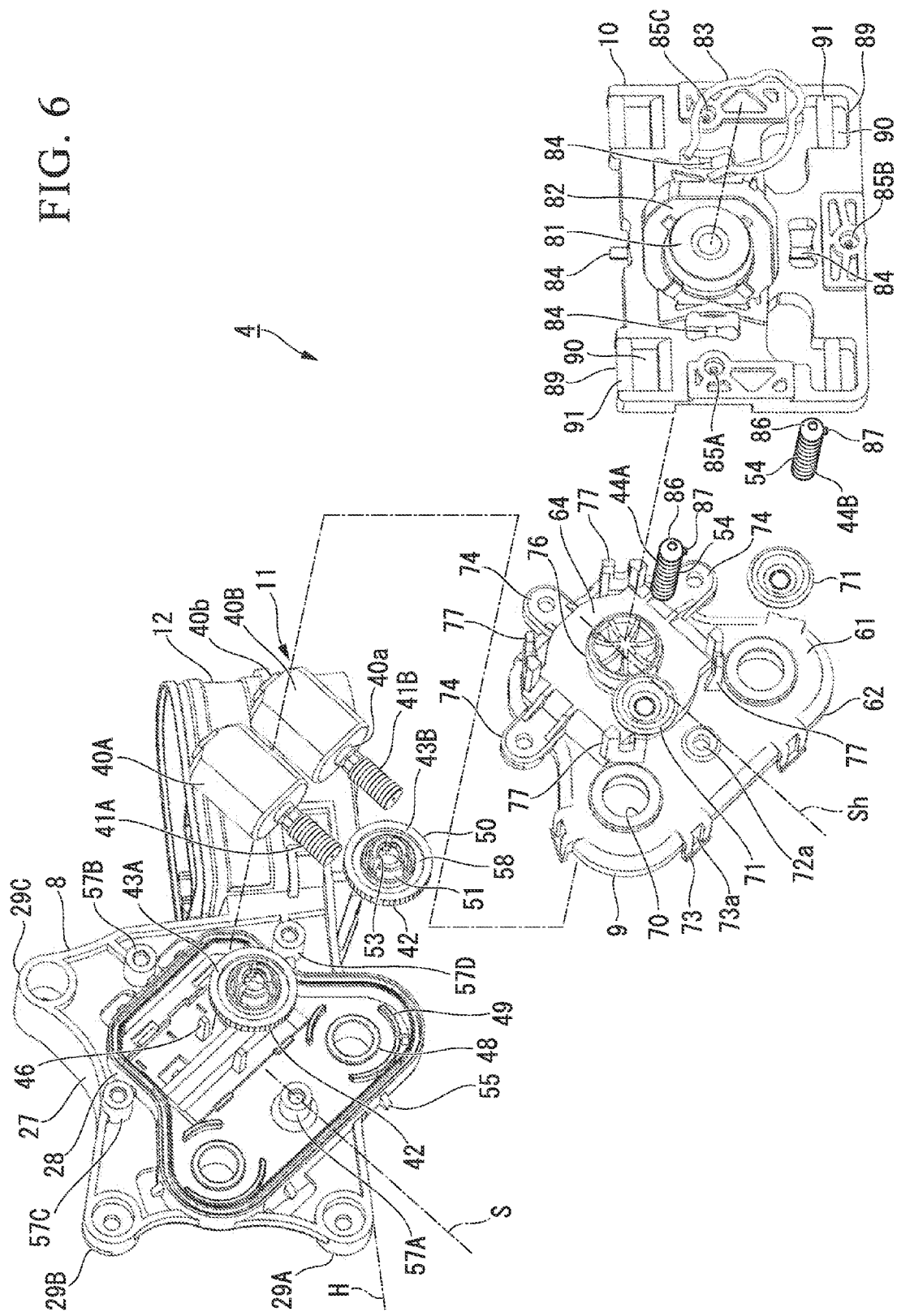
FIG. 6 is an exploded perspective view of the drive unit.

As shown in FIG. 3, FIG. 5, and FIG. 6, the drive unit 4 includes; a bracket 8 turnably attached to the arm 100a of the door mirror stay 100, a holder 9 attached to the bracket 8, a pivot plate 10 turnably attached to the holder 9, a mirror tilting drive section 11 housed between the bracket 8 and the holder 9, and so forth. The bracket 8, the holder 9, and the pivot plate 10 are made of resin.

The bracket 8 includes; a retractable drive member case (hereinafter, referred to as a case) 12 in which a retractable drive member is stored, and a bracket body 13 formed projecting outward from the case 12 in the vehicle width direction, which are integrally formed.

The case 12 has a bottomed box shape with an upper part being opened, and a bottom and an upper end of the case 12 are in a substantially horizontal posture when the door mirror device 1 is installed on the vehicle door. As shown in FIG. 3, a retractable drive motor 14 is fixed in the case 12. Moreover, a shaft 15 fixed in an upright posture to the arm 100a is inserted into the case 12, penetrating through the bottom of the case 12, and the shaft 15 and an output shaft of the retractable drive motor 14 are connected to each other via a gear train 16. Consequently, because the shaft 15 is fixed, when the retractable drive motor 14 is rotated, the retractable drive motor 14 revolves around the shaft 15. As a result, the bracket 8 that supports the retractable drive motor 14 rotates about the shaft 15. Then, as a result, the mirror housing 2 fixed to the bracket 8 rotates about the shaft 15.

Figure 7:
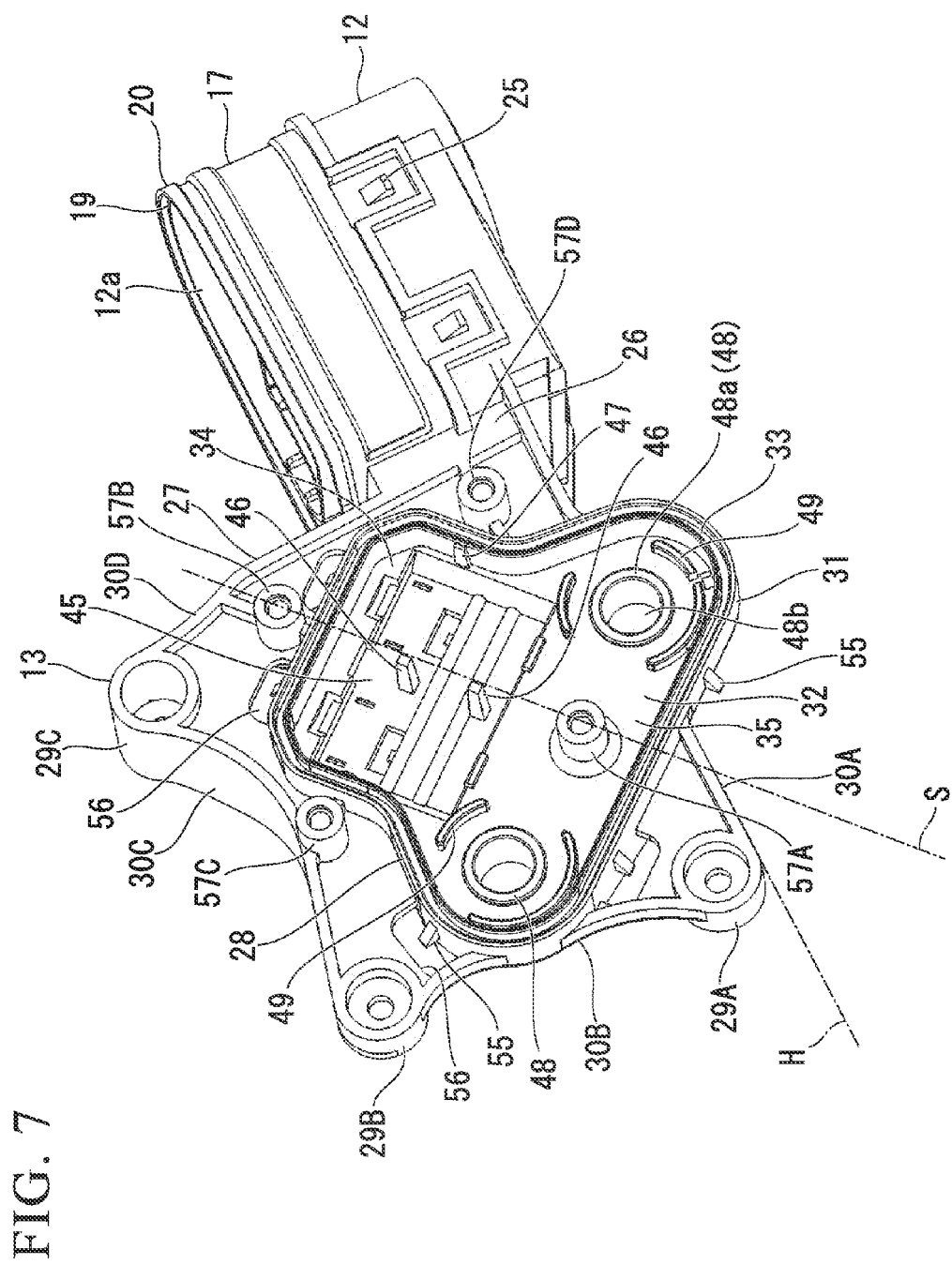
FIG. 7 is a perspective view of a bracket of the drive unit as seen from a rear side of the vehicle.

As shown in FIG. 5 to FIG. 7, a peripheral wall 17 of the case 12 has an opening 12a in an upper part, and a cap 18 is attached to the opening 12a to seal the case 12. An upper surface of the peripheral wall 17 is formed horizontally, and a step 19 is formed inside of an upper end of the peripheral wall 17. An engaging protrusion 20 is annularly formed outside of the step 19. Upper surfaces of the step 19 and the engaging protrusion 20 are horizontally formed.

Figure 4:
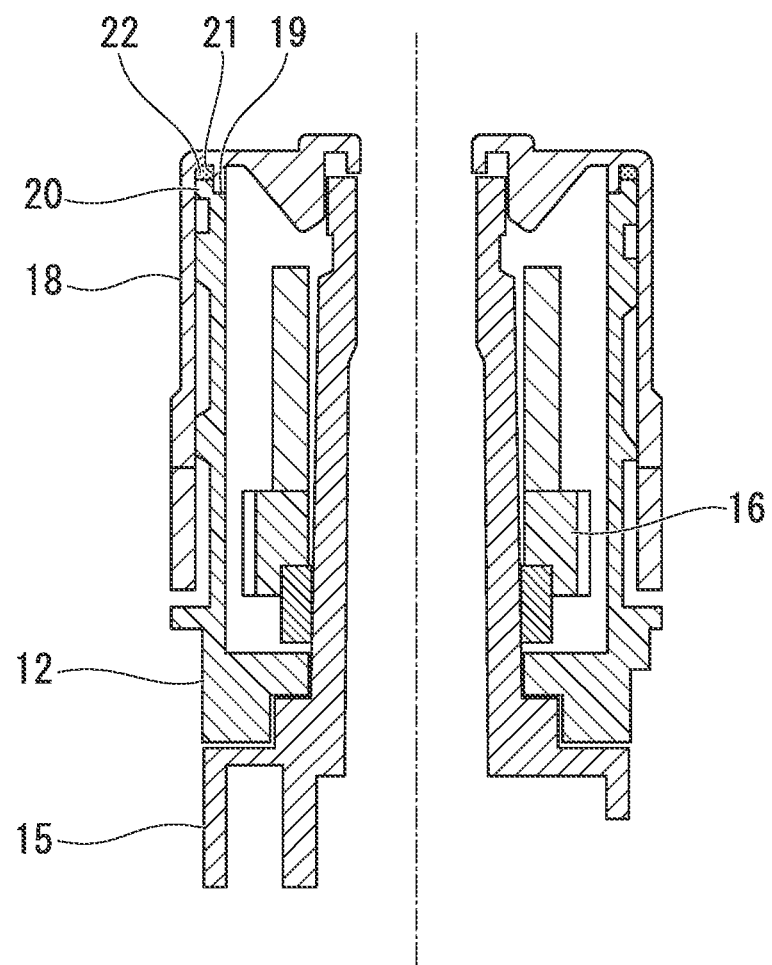
FIG. 4 is a sectional view along line B-B in FIG. 3.

On the other hand, as shown in FIG. 4, an engaging groove 21 into which the engaging protrusion 20 of the case 12 can be inserted, is formed in an inner circumference of the cap 18. The engaging groove 21 is also horizontally formed with respect to the engaging protrusion 20.

At the time of fitting the cap 18, the top and bottom of the cap 18 is inverted to apply a sealant 22 substantially uniformly onto the entire circumference of the engaging groove 21. Subsequently, the top and bottom of the cap 18 are returned and the cap 18 is placed on the peripheral wall 17 of the case 12 from above, the engaging protrusion 20 of the case 12 is inserted into the engaging groove 21 of the cap 18, and the space between the engaging groove 21 and the engaging protrusion 20 is sealed with the sealant 22. Because the engaging groove 21 of the cap 18 is formed horizontally, the sealant 22 can be prevented from running down in an oblique direction, so long as the top and bottom of the cap 18 is inverted to apply the sealant 22 to the engaging groove 21 and the cap 18 is kept horizontal when the top and bottom of the cap 18 are returned. Furthermore, because the depressed portion 19 of the case 12 and the upper surface of the engaging protrusion 20 are formed horizontally, then also when the cap 18 covers the case 12, and the engaging protrusion 20 is inserted into the engaging groove 21, the sealant 22 can be prevented from running down in an oblique direction. Moreover, a state can be maintained in which the sealant 22 is applied substantially uniformly to the entire circumference between the engaging protrusion 20 and the engaging groove 21. As a result, a joining section between the case 12 and the cap 18 (that is, between the engaging protrusion 20 and the engaging groove 21) can be reliably sealed over the entire circumference thereof. As shown in FIG. 3, the cap 18 is fixed to the case 12 by locking a locking hole 24 formed in four legs 23 extending downward, to a locking protrusion 25 formed on the peripheral wall 17 of the case 12.

As shown in FIG. 7, the bracket body 13 includes a base 27 connected to the case 12 via a neck 26, and a tilting drive section housing (hereinafter, referred to as a housing) 28 formed on a rear surface of the base 27. The base 27 becomes in a substantially vertical posture when the door mirror device 1 is installed on the vehicle door. Bosses 29A, 29B, and 29C for fixing the mirror housing, are provided on the base 27 at upper and lower ends on a side far from the neck 26 and at an upper end on a side close to the neck 26. The boss 29A provided at the lower end on the side far from the neck 26 and a lower part of the neck 26 are connected to each other by a flat plate rib 30A, and the rib 30A becomes in a substantially horizontal posture when the door mirror device 1 is installed on the vehicle door. In the first embodiment, a horizontal line extending along a longitudinal direction of the rib 30A becomes a horizontal reference line H of the bracket 8. Moreover, the boss 29A and the boss 29B provided at the upper end on the side far from the neck 26 are connected to each other by a rib 30B, the boss 29B and the boss 29C provided at the upper end on the side close to the neck 26 are connected to each other by a rib 30C, and the boss 29C and the upper part of the neck 26 are connected to each other by a rib 30D.

The housing 28 has a line-symmetric shape with respect to a virtual reference line S that forms an elevation angle of about 45 degrees with respect to the horizontal reference line H of the bracket 8. The bottom of the housing 28 is shared with the base 27, a peripheral wall 31 of the housing 28 protrudes rearward from the base 27, and a housing depressed portion 32 for housing the mirror tilting drive section 11 is formed on the inside of the peripheral wall 31. Moreover, a fitting portion 33 having a U-shape in cross-section is formed on the apical surface of the peripheral wall 31.

The housing depressed portion 32 includes a motor housing 34 on an upper side thereof along the virtual reference line S and a gear housing 35 on a lower side thereof along the virtual reference line S. The motor housing 34 has a smaller size in a direction orthogonal to the virtual reference line S (hereinafter, referred to as a width direction of the housing 28) than the gear housing 35, and is positioned closer to the case 12. A lower end of the housing 28 on the gear housing 35 side protrudes downward from the base 27.

As shown in FIG. 6, the mirror tilting drive section 11 includes; two motors 40A and 40B, worm gears 41A and 41B fixed to output shafts of the respective motors 40A and 40B, two worm wheel gear rotating bodies 43A and 43B respectively having a worm wheel gear 42 that engages with each of the worm gears 41A and 41B, and two operation shafts 44A and 44B that are made to advance and retreat by the respective worm wheel gear rotating bodies 43A and 43B. In the door mirror device 1 for the left door, the motor 40A, the worm gear 41A, the worm wheel gear rotating body 43A, and the operation shaft 44A constitute a drive unit when the mirror unit 3 is tilted in the horizontal direction. The motor 40B, the worm gear 41B, the worm wheel gear rotating body 43B, and the operation shaft 44B constitute a drive unit when the mirror unit 3 is tilted in the vertical direction. In the explanation below, when there is no need to distinguish specifically between the drive unit for horizontal tilting and the drive unit for vertical tilting, these are described as the motor 40, the worm gear 41, the worm wheel gear rotating body 43, and the operation shaft 44.

As shown in FIG. 7, the two motors 40A and 40B are housed in the motor housing 34 of the housing 28, and are arranged so that the respective output shafts are parallel to each other. A temporary motor positioning depression 45 for the motors 40A and 40B, and a plurality of temporary positioning ribs 46 and 47 are provided in the motor housing 34.

The two temporary positioning ribs 46 provided in an upright condition in the center of the temporary motor positioning depression 45 are arranged between the two motors 40A and 40B. The two temporary positioning ribs 47 (only one rib is shown in FIG. 7 for convenience sake) provided along the peripheral wall 31 in the motor housing 34 are arranged along an outer surface of the motor 40A or the motor 40B.

Figure 8:
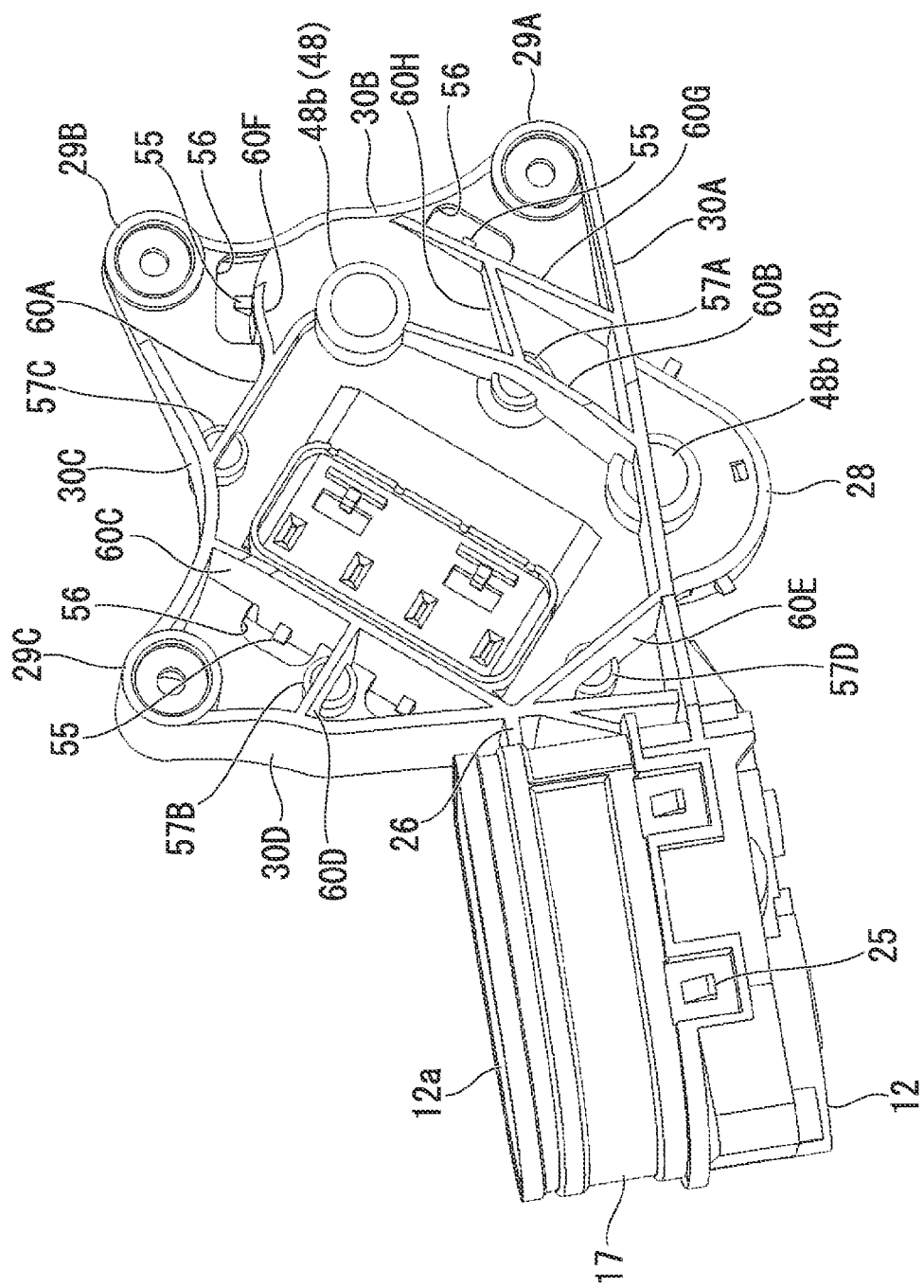
FIG. 8 is a perspective view of the bracket of the drive unit as seen from a front side of the vehicle.

External cylindrical portion 48 for ensuring a movement space of the operation shafts 44A and 44B when the operation shafts 44A and 44B advance and retreat, are formed at the opposite ends of the housing in the width direction in the gear housing 35 and at line-symmetric positions with respect to the virtual reference line S. An opening end 48a of the external cylindrical portions 48 slightly protrudes rearward from the bottom of the gear housing 35. Moreover, as shown in FIG. 8, bottoms 48B of the external cylindrical portions 48 protrude from the base 27 toward a front surface side.

In the gear housing 35, on the outside of the opening end 48a of each external cylindrical portion 48 there is provided a temporary positioning rib 49 formed of a plurality of circular-arc protrusions arranged concentrically with the external cylindrical portion 48. The temporary positioning rib 49 protrudes rearward from the opening end 48a of the external cylindrical portion 48.

The two worm wheel gear rotating bodies 43A and 43B are respectively arranged on the temporary positioning ribs 49 provided around the corresponding external cylindrical portions 48.

As shown in FIG. 2 and FIG. 6, the worm wheel gear rotating body 43 is constituted by integrally forming an outer body 50 and a central cylindrical portion 51. The worm wheel gear 42 which is screwed into the worm gear 41 is formed on the rear side of the body 50. A collar 52 to be inserted into the inside of the temporary positioning rib 49 is formed on the front side of the body 50. An outer diameter of the worm wheel gear 42 is larger than an inner diameter of the temporary positioning rib 49, and an outer diameter of the collar 52 is smaller than an inner diameter of the temporary positioning rib 49, so that when the collar 52 abuts against the opening end 48a of the external cylindrical portion 48, the worm wheel gear 42 is positioned on an upper side of the temporary positioning rib 49 with a gap therebetween.

A rear side from a substantially axial center of the cylindrical portion 51 is divided into three in the circumferential direction, and the rear side of each segment can deform elastically in a radial direction. A claw 53 formed at a rear end of each segment and protruding radially inward is threadably engaged with a threaded portion 54 formed on an outer periphery of the operation shaft 44.

A plurality of locking protrusions 55 for locking the holder 9 are provided on the outer periphery of the peripheral wall 31 of the housing 28. The locking protrusions 55 also are arranged at line-symmetric positions with respect to the virtual reference line S. In the base 27, leg inserting holes 56 are formed at portions corresponding to the locking protrusions 55.

A boss 57A for fixing the holder, is provided substantially at the center of the gear housing 35 and on the virtual reference line S. Moreover, three bosses 57B to 57D for fixing the holder, are provided on the base 27 outside of the motor housing 34 in the housing 28. Among these, the boss 57B is arranged on the virtual reference line S. The other two bosses 57C and 57D are arranged at line-symmetric positions with respect to the virtual reference line S. Consequently, a virtual line connecting both centers of the bosses 57A and 57B and a virtual line connecting both centers of the bosses 57C and 57D are orthogonal to each other. It is set such that a point of intersection of the two virtual lines overlaps on a pivot point of the pivot plate 10 described later. As shown in FIG. 7 and FIG. 8, the opposite ends of the bosses 57A to 57D for fixing the holder, protrude from the base 27.

As shown in FIG. 8, a plurality of ribs passing through the two external cylindrical portions 48 for the movement space of the bosses 57A to 57D for fixing the holder and the operation shafts 44A and 44B, are provided on the front side of the base 27. Specifically, a rib 30A that connects the boss 29A for fixing the mirror housing and a lower part of the neck 26 passes the external cylindrical portion 48 for the operation shaft 44B arranged on the lower side. A rib 30C that connects the bosses 29B and 29C for fixing the mirror housing, passes the boss 57C for fixing the holder arranged on the left side of the virtual reference line S in FIG. 7. The rib 30C has a curved shape for satisfying both rigidity and weight saving. Moreover, the boss 57C for fixing the holder, and the external cylindrical portion 48 for the operation shaft 44A arranged on the upper side, are connected to each other by a rib 60A, and the two external cylindrical portions 48 and the boss 57A for fixing the holder arranged between the external cylindrical portions, are connected to each other by a rib 60B. The rib 30C and an upper part of the neck 26 are connected to each other by a rib 60C, and a rib 60D that connects an intermediate part of the rib 60C and an intermediate part of the rib 30D, passes the boss 57B for fixing the holder. In the rib 30A, a rib 60E that connects the vicinity of the neck 26 and an upper part of the neck 26, passes the boss 57D for fixing the holder arranged on the right side of the virtual reference line S in FIG. 7. Furthermore, on the base 27, ribs 60F, 60G, and 60H are provided at portions adjacent to the two leg inserting holes 56 formed near the external cylindrical portion 48 for the operation shaft 44A. Consequently, since the ribs 30A to 30D and 60A to 60H are set, sufficient rigidity can be ensured for the bracket body 13, while achieving weight saving by decreasing the number of ribs. It is confirmed that the bracket body 13 has sufficient rigidity based on a CATIA (Computer Aided Three-Dimensional Interactive Application) intensity analysis.

The holder 9 is placed on the housing 28 of the bracket body 13 and fixed thereto, thereby housing the mirror tilting drive section 11 between the bracket 8 and the holder 9.

Figure 9:
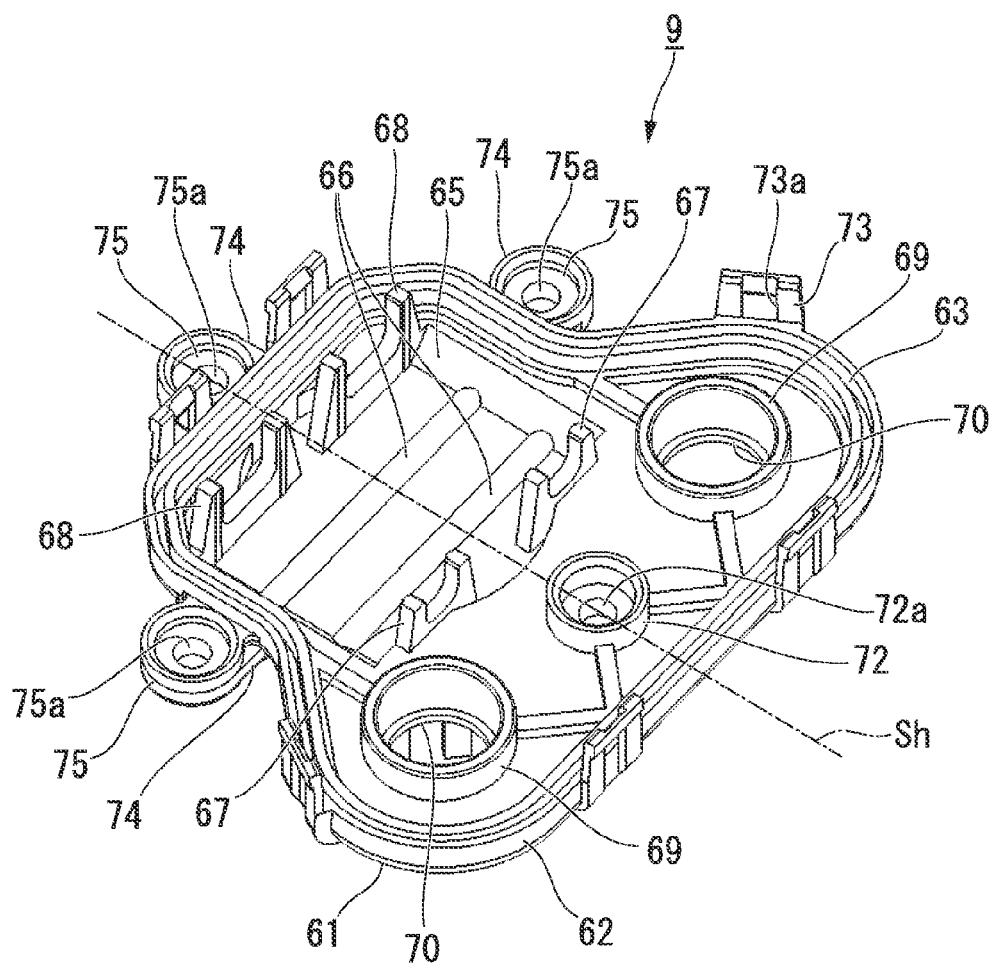
FIG. 9 is a perspective view of a holder of the drive unit as seen from the front side of the vehicle.

As shown in FIG. 9, the holder 9 has a line-symmetric shape with respect to a reference line corresponding to the virtual reference line S of the bracket 8 (hereinafter, referred to as a virtual reference line Sh of the holder 9), and includes a holder body 61 having a similar shape to the shape of the housing 28 as seen in plan view.

A fitting portion 63 having a U-shape in cross-section is formed at the apical surface of a peripheral wall 62 of the holder body 61. The fitting portion 63 is fitted to the fitting portion 33 of the peripheral wall 31 of the housing 28.

An elevated part 64 having a substantially rectangular shape as seen in plan view is formed on the rear surface of the holder body 61, and a motor housing depressed portion 65 is provided on the rear side of the elevated part 64. The motor housing depressed portion 65 is arranged inside of the peripheral wall 62 of the holder body 61 and corresponding to the motor housing 34 of the housing 28. Two motor pressing portions 66 extending in a bar shape in a direction orthogonal to the output shafts of the motors 40A and 40B are provided in the motor housing depressed portion 65, and the motor pressing portions 66 press the two motors 40A and 40B to the housing 28. Substantially U-shaped motor positioning ribs 67 that are fitted to ends 40a on the output shaft side of the motors 40A and 40B, and substantially U-shaped motor positioning ribs 68 that are fitted to ends 40b on the other side of the motors 40A and 40B, are provided in a protruding condition in the motor housing depressed portion 65. The respective motor positioning ribs 67 and 68 are arranged at line symmetric positions with respect to the virtual reference line Sh of the holder 9.

Annular gear positioning ribs 69 for positioning worm wheel gear rotating bodies 43A and 43B, are respectively provided in a protruding condition at line symmetric positions with respect to the virtual reference line Sh of the holder 9 at a portion corresponding to the gear housing 35 of the housing 28 inside of the peripheral wall 62 of the holder body 61. As shown in FIG. 2, by inserting the gear positioning rib 69 into a groove 58 formed in an annular shape on the rear surface of the body 50 of the worm wheel gear rotating body 43, the worm wheel gear rotating body 43 is positioned, and simultaneously, the worm wheel gear 42 is arranged outside of the gear positioning rib 69.

A hole 70 for passing the operation shaft 44 therethrough, is formed on the inside of the gear positioning rib 69. An end of the operation shaft 44 protrudes from the holder 9 through the hole 70. A grommet 71 is mounted between the hole 70 and the operation shaft 44 to effect sealing.

A circular depressed portion 72, into which the boss 57A for fixing the holder provided in the housing 28 can be fitted, is formed between the two gear positioning ribs 69 for the worm wheel gear rotating bodies and on the virtual reference line Sh of the holder 9. A screw insertion hole 72a is formed in the depressed portion 72.

The holder 9 includes a plurality of arms 73 extending forward from an external surface of the peripheral wall 62 of the holder body 61. The arms 73 are provided at portions corresponding to the locking protrusion 55 of the housing 28, and arranged in line symmetric positions with respect to the virtual reference line Sh of the holder 9. By locking a locking hole 73a provided in each arm 73 to the locking protrusion 55 of the housing 28, the holder 9 can be temporarily fixed to the housing 28.

Moreover, the holder 9 includes three legs 74 extending outward from the holder body 61 at portions corresponding to the bosses 57B, 57C, and 57D for fixing the holder of the bracket body 13. Circular depressed portions 75, into which the bosses 57B, 57C, and 57D can be fitted, are formed on front faces at the ends of the respective legs 74. A screw insertion hole 75a is provided at the center of the depressed portion 75. Furthermore, the legs 74 also are arranged at line symmetric positions with respect to the virtual reference line Sh of the holder 9.

The holder 9 is fixed to the bracket body 13 by screwing four screws (not shown) passing through the screw insertion holes 72a and 75a of the depressed portions 72 and 75 in the bosses 57A to 57D of the bracket body 13.

As shown in FIG. 6, the holder 9 includes a pivot shaft 76 with an external surface thereof being formed by a part of a spherical surface, on the elevated part 64 and on the virtual reference line Sh of the holder 9. A virtual line connecting the center of the pivot shaft 76 and the center of the gear positioning rib 69 of the worm wheel gear rotating body 43A is a horizontal line. A virtual line connecting the center of the pivot shaft 76 and the center of the gear positioning rib 69 of the worm wheel gear rotating body 43B is a vertical line. The horizontal line and the vertical line are set to be orthogonal to each other.

Moreover, the holder 9 includes U-shaped locking protrusions 77 protruding rearward from the rear surface of the holder body 61. The four locking protrusions 77 are arranged equidistance from the center of the pivot shaft 76 and are arranged with a spacing of 90 degrees about the pivot shaft 76.

A virtual line connecting the centers of the left and right locking protrusions 77 becomes a horizontal line, and a virtual line connecting the centers of the upper and lower locking protrusions 77 becomes a vertical line.

The pivot plate 10 is fitted so as to be tiltable three-dimensionally, to the pivot shaft 76 of the holder 9.

Figure 10:
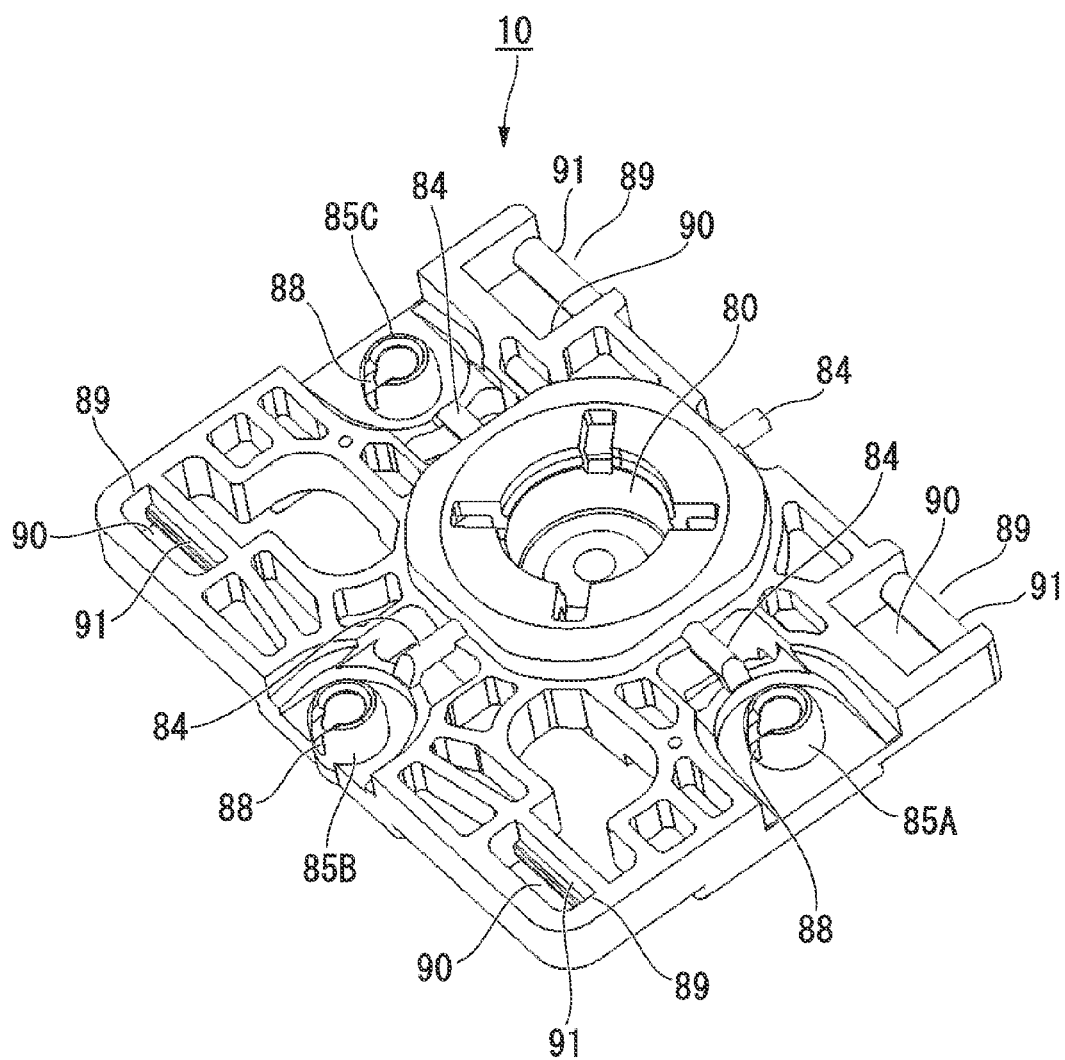
FIG. 10 is a perspective view of a pivot plate of the drive unit as seen from the front side of the vehicle.
Figure 11:
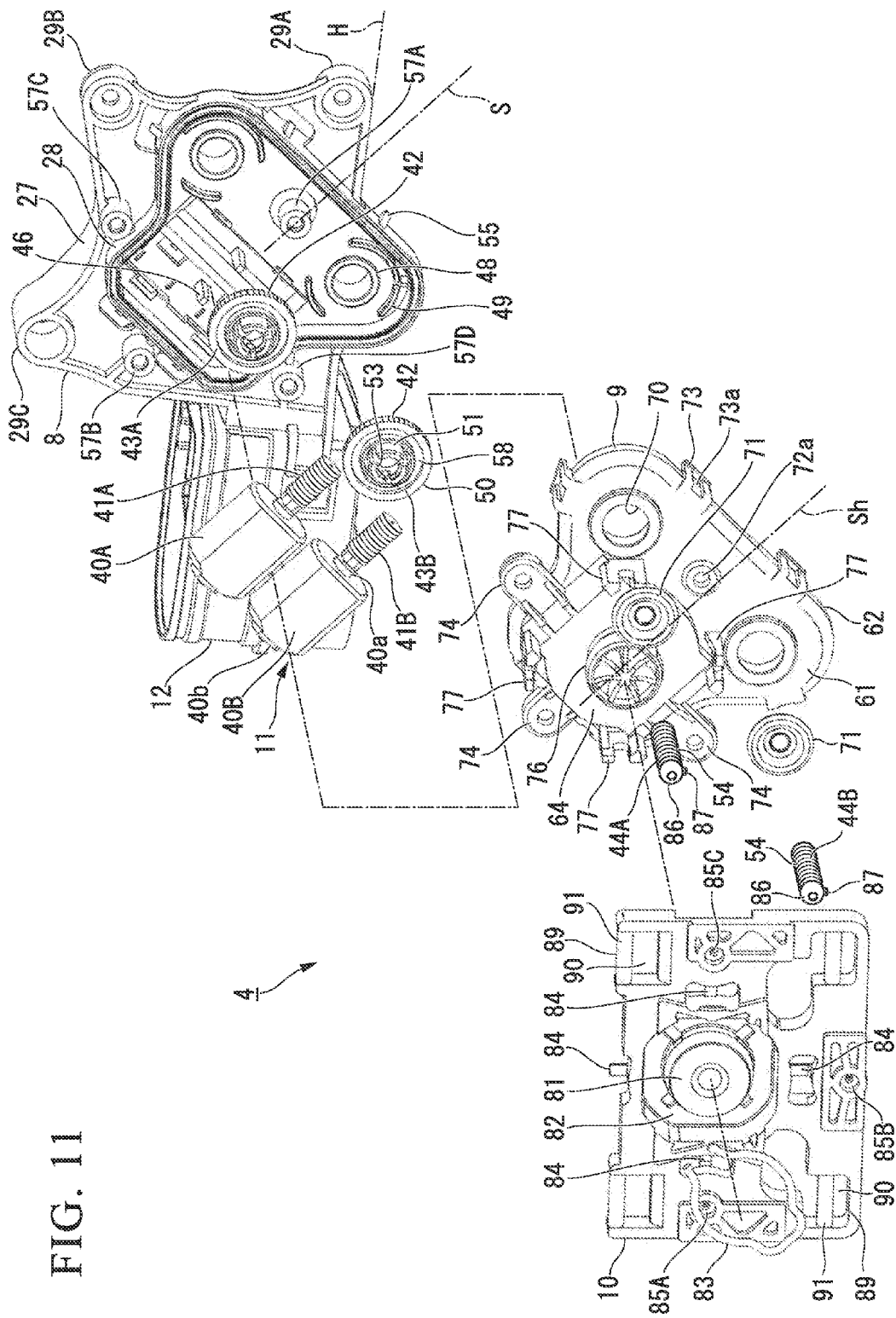
FIG. 11 is an exploded perspective view of the drive unit used for a door mirror device for a vehicle right door.

As shown in FIG. 10, the pivot plate 10 has a substantially rectangular shape as seen in plan view, and has a horizontally symmetrical shape. A pivot depressed portion 80, into which the pivot shaft 76 of the holder 9 can be press-fitted, is provided at a predetermined position on the front surface of the pivot plate 10. An inner surface of the pivot depressed portion 80 is formed by a part of a spherical surface. Moreover, in a state with the pivot shaft 76 being press-fitted into the pivot depressed portion 80, the pivot plate 10 can pivot freely about a virtual center of the sphere of the pivot shaft 76 of the holder 9 as a pivot point. In the first embodiment, the pivot shaft 76 and the pivot depressed portion 80 constitute a pivot section.

As shown in FIG. 6, a spring housing depressed portion 82 having a substantially rectangular shape as seen in plan view is formed on the rear surface of the pivot plate 10 around a convex portion 81, which is a portion corresponding to the pivot depressed portion 80. Moreover, a substantially C-shaped spring 83 that engages with a base of the convex portion 81 is housed in the spring housing depressed portion 82. The spring 83 tightens the base of the convex portion 81 to prevent diameter expansion of the base. Consequently, a situation where the pivot shaft 76 of the holder 9 is separated from the pivot depressed portion 80 can be prevented.

Moreover, the pivot plate 10 is provided with four rotation regulating pins 84 arranged with a spacing of 90 degrees on the outside of the spring housing depressed portion 82. The locking protrusions 77 of the holder 9 engage with the respective rotation regulating pins 84. Consequently, a situation where the holder 9 and the pivot plate 10 rotate relative to each other around a longitudinal axis passing through the center of the pivot shaft 76 can be prevented.

As shown in FIG. 10, three spherical receptors 85A, 85B, and 85C are provided on the right side, the lower side, and the left side of the pivot depressed portion 80 on the front surface of the pivot plate 10 as seen from the front surface thereof at equidistant positions from the center of the pivot depressed portion 80, shifted by 90 degrees with respect to each other. Spherical heads 86 respectively formed at the ends of the operation shafts 44A and 44B are fitted into the right and lower spherical receptors 85A and 85B, as seen from the front surface side. Moreover, a protrusion 87 provided in an upright condition on the side of the head 86 engages with a groove 88 formed in the spherical receptors 85A and 85B. By fitting the heads 86 of the operation shafts 44A and 44B into the spherical receptors 85A and 85B, respectively, the operation shafts 44A and 44B and the pivot plate 10 are connected inseparably and integrally, while allowing sliding between the heads 86 and the spherical receptors 85A and 85B. Furthermore, by engaging the protrusion 87 with the groove 88, a situation where the operation shafts 44A and 44B rotate about their own axes can be prevented.

In a state with the pivot plate 10 mounted on the holder 9, the virtual line connecting both centers of the left and right spherical receptors 85A and 85C becomes the horizontal line. This virtual line is orthogonal to a virtual line extending in the longitudinal direction passing through the pivot point of the pivot plate 10.

In the door mirror device 1 fitted to the left door for the front seat of the vehicle shown in FIG. 1, the heads 86 of the operation shafts 44A and 44B are fitted into the lower and right spherical receptors 85A and 85B of the three spherical receptors 85A, 85B, and 85C, as seen from the front surface of the pivot plate 10. In this case, the left spherical receptor 85C need not be used. However, in the door mirror device 1 fitted to the right door for the front seat (not shown) of the vehicle shown in FIG. 11, the head 86 of the operation shaft 44B is fitted into the lower spherical receptor 85B as seen from the front surface of the pivot plate 10, and the head 86 of the operation shaft 44A is fitted into the left spherical receptor 85C as seen from the front surface of the pivot plate 10. In this case, the spherical receptor 85A on the right as seen from the front surface of the pivot plate 10 need not be used.

A mirror engaging portion 89 is provided at four corners of the pivot plate 10. The mirror engaging portion 89 includes a square hole 90 having a rectangular shape as seen in plan view, and a pin 91 spanning over the square hole 90 in the horizontal direction. An engaging claw (not shown) provided in the mirror holder 7 can be engaged with the pin 91, and by engaging the engaging claw with the pin 91, the mirror holder 7 is supported on the pivot plate 10.

An assembly procedure of the drive unit 4 is briefly explained below.

First, the pivot plate 10 is set on a pressure platform (not shown) with the pivot depressed portion 80 being the upper side. The holder 9 is arranged on the pivot plate 10. The holder 9 is arranged so that the fitting portion 63 of the holder 9 faces upward, the four locking protrusions 77 of the holder 9 and the four rotation regulating pins 84 of the pivot plate 10 are arranged so as to face each other, and the pivot shaft 76 of the holder 9 and the pivot depressed portion 80 of the pivot plate 10 are arranged so as to face each other. Moreover, the grommets 71 are mounted in the two holes 70 of the holder 9 beforehand.

Subsequently, the motors 40A and 40B, the worm gears 41A and 41B, the worm wheel gear rotating bodies 43A and 43B, and the operation shafts 44A and 44B are housed in the holder 9. When the motors 40A and 40B and the worm gears 41A and 41B are housed in the holder 9, the worm gears 41A and 41B are mounted on the output shafts of the motors 40A and 40B beforehand. Moreover, the ends 40a of the motors 40A and 40B are fitted to the motor positioning ribs 67 of the holder 9, and the ends 40b are fitted to the motor positioning ribs 68 of the holder 9. Consequently, the motors 40A and 40B are accurately positioned with respect to the holder 9. Furthermore, when the worm wheel gear rotating bodies 43A and 43B are housed in the holder 9, the gear positioning rib 69 of the holder 9 is inserted into the groove 58 of the worm wheel gear rotating bodies 43A and 43B. Consequently, the worm wheel gears 42 of the worm wheel gear rotating bodies 43A and 43B are accurately positioned with respect to the holder 9. Furthermore, when the operation shafts 44A and 44B are housed, while the operation shafts 44A and 44B pass through the grommet 71, the threaded portions 54 of the operation shafts 44A and 44B are threadably engaged with the claws 53 of the worm wheel gear rotating bodies 43A and 43B after being positioned. Furthermore, the heads 86 of the operation shafts 44A and 44B and the spherical receptors 85A and 85B of the pivot plate 10 are arranged so as to face each other, and the protrusions 87 of the operation shafts 44A and 44B and the grooves 88 of the spherical receptors 85A and 85B are arranged as to face each other.

Subsequently, the bracket 8 is placed on the holder 9. At this time, the fitting portion 62 of the holder 9 is fitted to the fitting portion 33 on the peripheral wall 31 of the housing 28 in the bracket 8. Consequently, the tips of the bosses 57A to 57D for fixing the holder of the bracket 8 are arranged corresponding to the depressed portions 72 and 75 of the holder 9, the locking holes 73a of the respective arms 73 of the holder 9 are arranged corresponding to the respective locking protrusions 55 of the housing 28, and the temporary positioning ribs 46 for the motor of the bracket 8 are arranged between both motors 40A and 40B. Moreover, the temporary positioning ribs 47 for the motor are arranged outside of the motors 40A and 40B, and the temporary positioning ribs 49 for the gears are arranged outside of the collars 52 of the worm wheel gear rotating bodies 43A and 43B.

As described above, the mirror tilting drive section 11 is housed between the bracket 8 and the holder 9, these are overlapped on the pivot plate 10, and pressure is applied thereto from above the bracket 8. As a result, the pivot shaft 76 of the holder 9 is press-fitted into the pivot depressed portion 80 of the pivot plate 10. The heads 86 of the operation shafts 44A and 44B are fitted into the spherical receptors 85A and 85B of the pivot plate 10. The locking holes 73a of the respective arms 73 of the holder 9 engage with the respective locking protrusions 55 of the housing 28. Moreover, the respective locking protrusions 77 of the holder 9 engage with the respective rotation regulating pins 84 of the pivot plate 10, so that the bracket 8, the holder 9, and the pivot plate 10 are integrated.

The overlapped state is inverted, and a screw member (not shown) is inserted from the screw insertion holes 72a and 75a of the holder 9, and screwed into the bosses 57A to 57D to fix the holder 9 to the bracket 8. Moreover, the spring 83 is mounted on the base of the convex portion 81 of the pivot plate 10, the retractable drive motor 14, the shaft 15, the gear train 16, and the like are housed in the case 12 of the bracket 8, and the cap 18 is fitted thereto, thereby completing the drive unit 4.

In the door mirror device 1 having the above-described configuration, the operation shafts 44A and 44B are connected to the pivot plate 10 so as not to rotate about their own axes. Therefore, when a switch (not shown) near the driver's seat in the vehicle interior is operated to rotate the motor 40A and then the worm wheel gear rotating body 43A, the operation shaft 44A advances and retreats, and hence the pivot plate 10 can pivot horizontally. Likewise, when the motor 40B is rotated by operating the switch and the worm wheel gear rotating body 43B is rotated, the operation shaft 44B advances and retreats, and hence the pivot plate 10 can pivot vertically. As a result, the mirror unit 3 held by the pivot plate 10 can be tilted in an appropriate desired direction to view rearward.

In the door mirror device 1, the housing 28 is integrally formed with the bracket 8, and the mirror tilting drive section 11 is housed between the housing 28 and the holder 9. Consequently, the number of parts can be reduced by one, as compared with a conventional case in which the mirror tilting drive section is housed in a two-piece type case and the case is fitted to the bracket.

Moreover, the pivot plate 10 is connected to the holder 9 pivotably by press-fitting the pivot shaft 76 of the holder 9 into the pivot depressed portion 80 of the pivot plate 10. Consequently, a means (for example, a bolt) that disables disengagement of the holder 9 and the pivot plate 10 is not required as in the conventional case, and the number of parts can be reduced further.

As a result, cost reduction of the door mirror device 1 can be achieved.

Moreover, the bracket 8 and the holder 9 can be assembled on the same assembly line. Furthermore, the holder 9 and the pivot plate 10 can be assembled. In addition, a process of inverting the top and bottom can be omitted, thereby enabling to simplify the assembly. As a result, productivity is improved.

Moreover, the two operation shafts 44A and 44B of the mirror tilting drive section 11 are arranged at line-symmetric positions with respect to the virtual reference line Sh of the holder 9 that forms an elevation angle of 45 degrees with respect to the horizontal reference line H of the bracket 8 and passes the pivot point of the pivot plate 10, and are distributed about the pivot point with a spacing of 90 degrees. Furthermore, fitting portions between the bracket 8 and the holder 9 (that is, the bosses 57A to 57D for fixing the holder of the bracket 8, the locking protrusions 55 of the bracket 8, the fitting portions 33 on the peripheral wall of the bracket 8, the arms 73 of the holder 9, the legs 74 of the holder 9, and the fitting portions 63 of the holder 9) are arranged at line-symmetric positions with respect to the virtual reference lines S and Sh. Consequently, the holder 9 of the door mirror device 1 for the left door shown in FIG. 6 and the holder 9 of the door mirror device 1 for the right door shown in FIG. 11 can be shared. As is obvious from FIG. 6 and FIG. 11, the bracket 8 cannot be shared by the left and right doors. Hence a single-purpose bracket 8 is prepared for the door mirror device 1 for the left door and a single-purpose bracket 8 is prepared for the door mirror device 1 for the right door. The bracket 8 for the left door and the bracket 8 for the right door have the same configuration except for having a symmetrical shape to each other.

Moreover, the four locking protrusions 77 provided on the holder 9 for preventing relative rotation of the pivot plate 10 are arranged equidistance from the center of the pivot shaft 76 and with a spacing of 90 degrees centering on the pivot shaft 76. Furthermore, the virtual line connecting the centers of the left and right locking protrusions 77 becomes the horizontal line, and the virtual line connecting the centers of the upper and lower locking protrusions 77 becomes the vertical line. Moreover, the pivot plate 10 has a symmetrical shape, and the rotation regulating pin 84 is provided corresponding to the locking protrusion 77. Consequently, the pivot plate 10 of the door mirror device 1 for the left door for the front seat shown in FIG. 6 and the pivot plate 10 of the door mirror device 1 for the right door for the front seat shown in FIG. 11 can be shared.

Thus, the holder 9 and the pivot plate 10 can be common parts for the left and right door mirror devices 1. As a result, parts management can be facilitated and productivity is improved.

Second Embodiment

Hereunder, a mirror surface angle adjusting device of a second embodiment according to the present invention will be explained with reference to FIG. 12 to FIG. 16. Components similar to those in the first embodiment are denoted by the same reference symbols, and description thereof is omitted. The second embodiment is different from the first embodiment in that a holder and a bracket can be assembled on the same assembly line, and when left and right door mirror devices are installed at bilaterally symmetrical positions in a vehicle body, the holder can be a common part for the left and right sides and the pivot plate can be a common part for the left and right sides as well. In the explanation below, unless otherwise specified, the front and back direction corresponds to the front and back direction of the vehicle body, and the horizontal direction corresponds to the left and right direction when a passenger faces the front.

Figure 12:
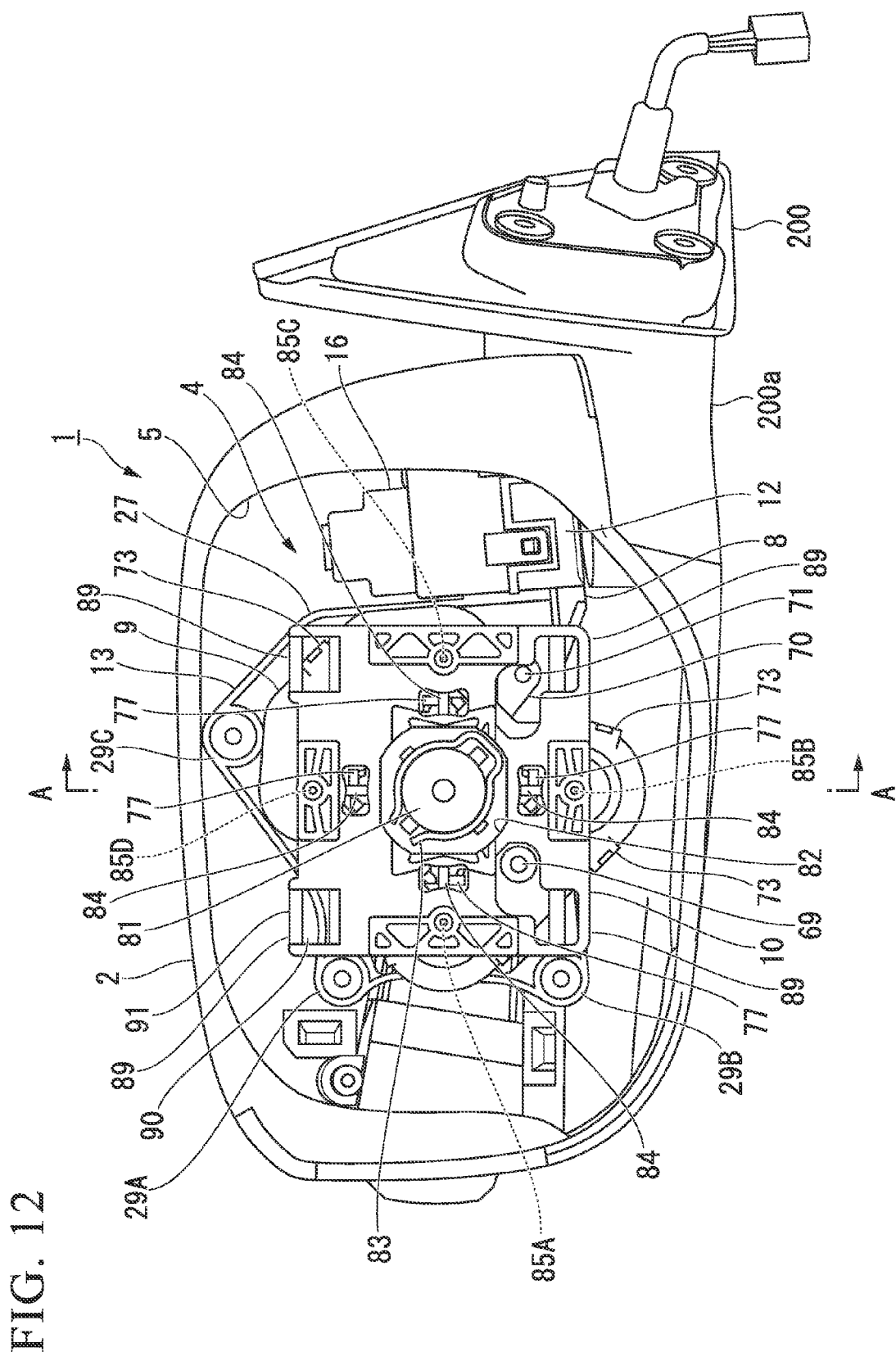
FIG. 12 is a front view of a door mirror device for a vehicle left door provided with a mirror surface angle adjusting device according to a second embodiment.

FIG. 12 is a front view of a door mirror device 1 fitted to a left door for a front seat (not shown) of a car (vehicle). The door mirror device 1 is installed on an arm 200a of a door mirror stay 200 fitted to the door so as to be able to open and close in the vehicle width direction. Moreover, the door mirror device 1 can be rotated in a direction approaching the door (a closing direction) and housed, or in a direction away from the door (an opening direction) so as to view rearward, by operating a switch (not shown) near the driver's seat in the vehicle interior, or by operating a hand-held remote control switch (not shown).

Figure 14:
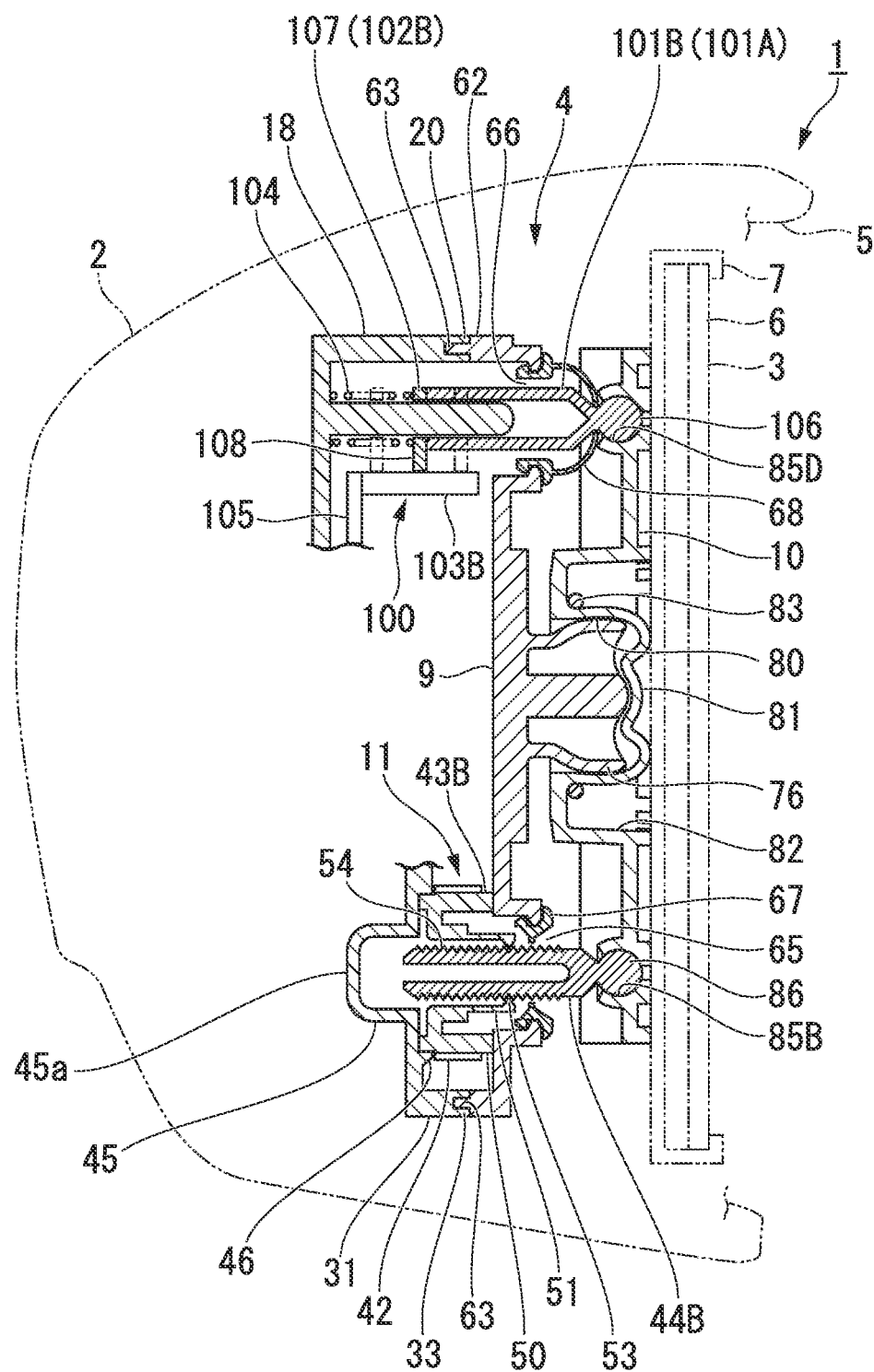
FIG. 14 is a sectional view along line A-A in FIG. 12.
Figure 15:
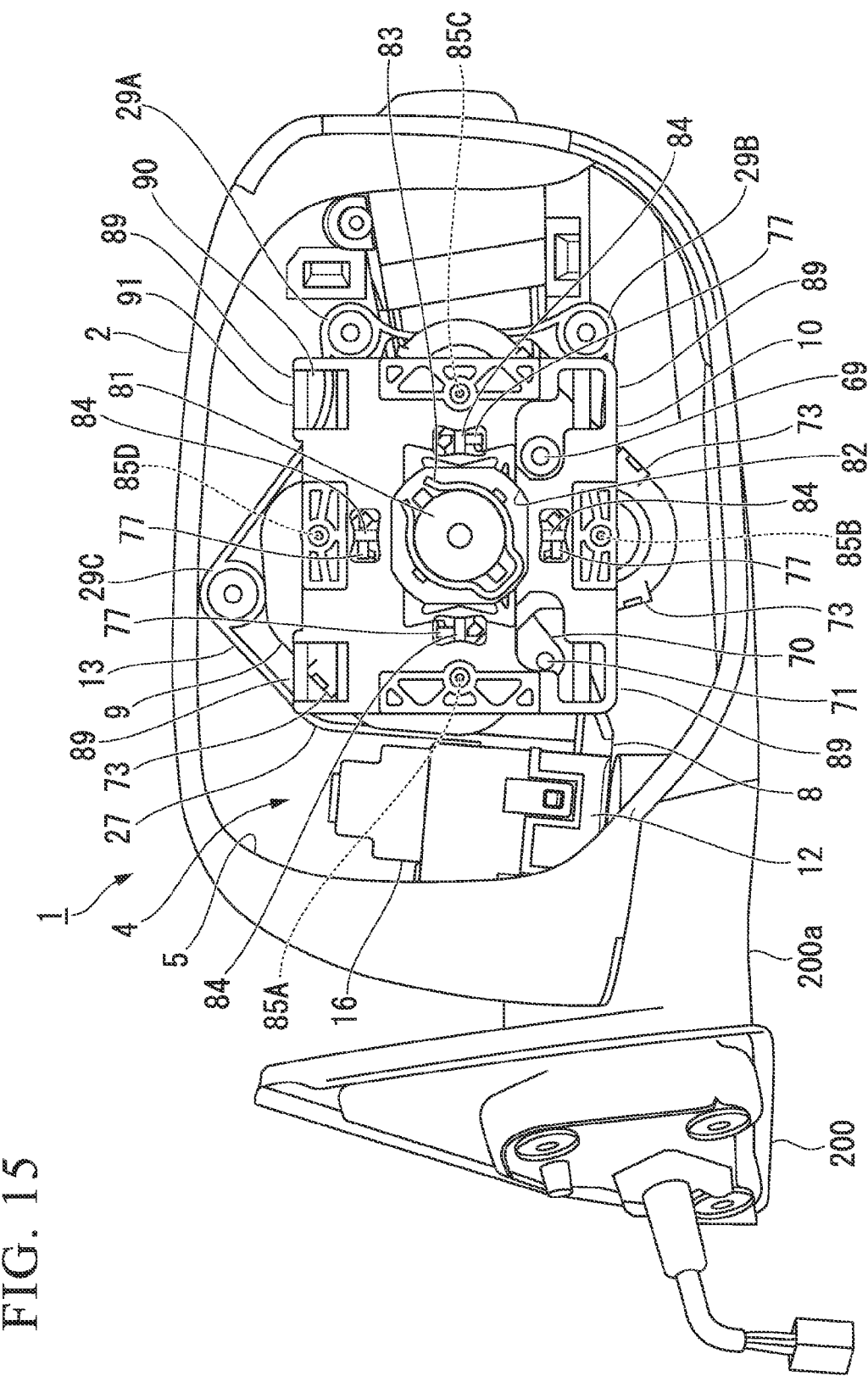
FIG. 15 is a front view of a door mirror device for a vehicle right door provided with a mirror surface angle adjusting device according to the present invention.

As shown in FIG. 12 and FIG. 14, the door mirror device 1 includes; a mirror housing 2, a mirror unit 3, and a drive unit 4 that rotatably supports the mirror housing 2 with respect to the door and tiltably supports the mirror unit 3. In the second embodiment, the mirror surface angle adjusting device is incorporated in the drive unit 4 as a part of the drive unit 4.

The mirror housing 2 is made of resin and has a cup shape with the rear side being opened. Moreover, the mirror unit 3 is arranged in the mirror housing 2 at a position close to an opening 5. The mirror unit 3 is constituted by a mirror 6 and a mirror holder 7 that supports the mirror 6, and the mirror holder 7 is configured so as to be tiltable by the drive unit 4.

Figure 13:
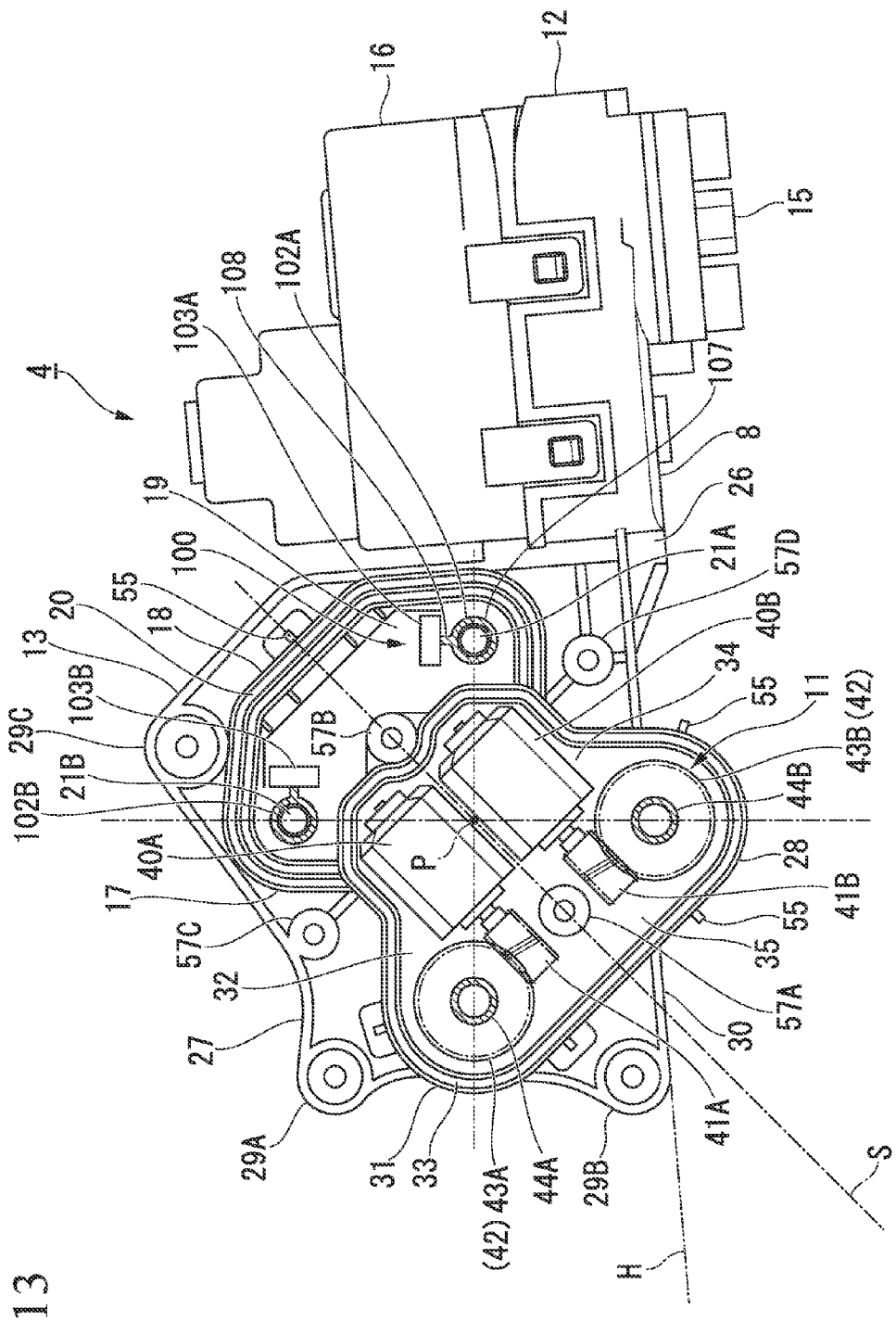
FIG. 13 is a front view of a drive unit in the door mirror device for the vehicle left door.

The drive unit 4 includes; a bracket 8 turnably fitted to the arm 200a of the door mirror stay 200, a holder 9 fitted to the bracket 8, a pivot plate 10 turnably fitted to the holder 9, a mirror tilting drive section 11 housed in a housing space between the bracket 8 and the holder 9, and an angle detection section 100 (see FIG. 13). The bracket 8, the holder 9, and the pivot plate 10 are made of resin.

As shown in FIG. 13, the bracket 8 includes; a retractable drive member case (hereinafter, referred to as a case) 12, and a bracket body 13 formed projecting outward from the case 12 in the vehicle width direction, which are integrally formed.

A shaft 15 fixed in an upright posture to the arm 200a is inserted into the case 12 from the bottom of the case 12. The shaft 15 is connected to a retractable drive motor (not shown) fixed in the case 12, via a gear (not shown). When the retractable drive motor is rotated, the retractable drive motor revolves around the shaft 15 because the shaft 15 is fixed. Consequently, the bracket 8 that fixes the retractable drive motor rotates about the shaft 15. As a result, the mirror housing 2 fixed to the bracket 8 rotates about the shaft 15. A cap 16 is fitted to the case 12 to effect sealing.

The bracket body 13 includes; a base 27 connected to the case 12 via a neck 26, a tilting drive section housing 28 formed on a rear surface of the base 27, and a sensor housing 17.

The base 27 becomes in a substantially vertical posture when the door mirror device 1 is installed on the vehicle door. Bosses 29A, 29B, and 29C for fixing the mirror housing are provided on the base 27 at upper and lower ends on a side far from the neck 26 and at an upper end on a side close to the neck 26. Moreover, there is formed a rib 30 in a horizontal plate shape connected to the boss 29B, and the rib 30 becomes in a substantially horizontal posture when the door mirror device 1 is installed on the vehicle door. In the second embodiment, a horizontal line extending along a longitudinal direction of the rib 30 becomes a horizontal reference line H of the bracket 8.

The tilting drive section housing 28 and the sensor housing 17 are formed adjacent to each other on the rear surface of the base 27. The tilting drive section housing 28 is arranged on a lower side than the sensor housing 17. Moreover, the tilting drive section housing 28 and the sensor housing 17 have a line-symmetric shape with respect to a virtual reference line S that forms an elevation angle of about 45 degrees with respect to the horizontal reference line H of the bracket 8, and the bottoms of the tilting drive section housing 28 and the sensor housing 17 are shared with the base 27.

A peripheral wall 31 of the tilting drive section housing 28 protrudes rearward from the base 27, and a housing depressed portion 32 for housing the mirror tilting drive section 11 is formed on the inside of the peripheral wall 31. Moreover, a fitting portion 33 having a U-shape in cross-section is formed on the apical surface of the peripheral wall 31.

In the housing depressed portion 32, an upper side thereof along the virtual reference line S becomes a motor housing 34, and a lower side thereof along the virtual reference line S becomes a gear housing 35. The motor housing 34 has a smaller size in a direction orthogonal to the virtual reference line S (hereinafter, referred to as a width direction of the tilting drive section housing 28) than the gear housing 35, and is positioned closer to the case 12. A lower end of the tilting drive section housing 28 on the gear housing 35 side protrudes downward from the rib 30 of the base 27.

As shown in FIG. 13 and FIG. 14, the mirror tilting drive section 11 includes; two motors 40A and 40B, worm gears 41A and 41B fixed to output shafts of the respective motors 40A and 40B, two worm wheel gear rotating bodies 43A and 43B respectively having a worm wheel gear 42 that engages with each of the worm gears 41A and 41B, and two operation shafts 44A and 44B that are made to advance and retreat by the respective worm wheel gear rotating bodies 43A and 43B. In the door mirror device 1 for the left door, the motor 40A, the worm gear 41A, the worm wheel gear rotating body 43A, and the operation shaft 44A constitute a drive unit when the mirror unit 3 is tilted in the horizontal direction. The motor 40B, the worm gear 41B, the worm wheel gear rotating body 43B, and the operation shaft 44B constitute a drive unit when the mirror unit 3 is tilted in the vertical direction. In the explanation below, when there is no need to distinguish specifically between the drive unit for horizontal tilting and the drive unit for vertical tilting, these are described as the motor 40, the worm gear 41, the worm wheel gear rotating body 43, and the operation shaft 44.

The two motors 40A and 40B are housed in the motor housing 34 of the tilting drive section housing 28, and the output shaft of each motor is arranged to be parallel to the virtual reference line S.

As shown in FIG. 14, gear positioning ribs 46 that position the worm wheel gear rotating body 43 are provided annularly, respectively, at opposite ends in the width direction of the tilting drive section housing 28 in the gear housing 35 and at line-symmetric positions with respect to the virtual reference line S. Moreover, on the inside of each gear positioning rib 46, a cylindrical portion 45 for ensuring a movement space of the operation shaft 44 when the operation shaft 44 advances and retreats, is arranged concentrically with the gear positioning rib 46, with a bottom 45a protruding toward the front surface side.

As shown in FIG. 13, the worm wheel gear rotating body 43 is in a cylindrical shape and constituted by integrally forming an outer body 50 and a central cylindrical portion 51. The body 50 is positioned by inserting a front end thereof into the gear positioning rib 46, and is rotatably fitted to the tilting drive section housing 28. The worm wheel gear 42 which is screwed into the worm gear 41 is formed on an outer periphery of the body 50.

A rear side from a substantially axial center of the cylindrical portion 51 is divided into three in the circumferential direction, and the rear side of each segment can deform elastically in a radial direction. A claw 53 formed at a rear end of each segment and protruding radially inward is threadably engaged with a threaded portion 54 formed on an outer periphery of the operation shaft 44.

The sensor housing 17 is connected to the motor housing 34 of the tilting drive section housing 28. A peripheral wall 18 of the sensor housing 17 protrudes rearward from the base 27, and a housing depressed portion 19 that houses an angle detection section 100 is formed inside of the peripheral wall 18. The peripheral wall 18 of the sensor housing 17 is connected to the peripheral wall 31 of the tilting drive section housing 28, and the apical surfaces of both peripheral walls 18 and 31 are flush with each other. Moreover, a fitting portion 20 having a U-shape in cross-section is formed on the apical surface of the peripheral wall 31 of the sensor housing 17.

As shown in FIG. 13 and FIG. 14, the angle detection section 100 includes; two detection rods 101A and 101B, contact members 102A and 102B fitted corresponding to the respective detection rods 101A and 101B, variable resistors 103A and 103B provided corresponding to the contact members 102A and 102B, on which the contact members 102A and 102B slide, a spring 104 fitted corresponding to the respective detection rods 101A and 101B, and a substrate 105.

Guide rods 21A and 21B are provided in an upright condition rearward from the bottom of the housing depressed portion 19 at the opposite ends of the sensor housing 17 in the width direction in the housing depressed portion 19 and at line-symmetric positions with respect to the virtual reference line S.

A virtual line connecting the rotation center of the worm wheel gear rotating body 43A and a shaft center of the guide rod 21A and a virtual line connecting the rotation center of the worm wheel gear rotating body 43B and a shaft center of the guide rod 21B are arranged orthogonal to each other, and an intersection point P thereof is set to overlap on a pivot point of the pivot plate 10 described later. A distance from the intersection point P to the rotation centers of the worm wheel gear rotating bodies 43A and 43B and a distance from the intersection point P to the shaft centers of the guide rods 21A and 21B are set to be the same distance.

Moreover, the variable resistors 103A and 103B are installed so as to be parallel to the guide rods 21A and 21B in the housing depressed portion 19, and are also arranged at line-symmetric positions with respect to the virtual reference line S. The variable resistors 103A and 103B are electrically connected to the substrate 105 installed in the housing depressed portion 19.

The detection rod 101A, the contact member 102A, and the spring 104 are fitted to the guide rod 21A. The detection rod 101B, the contact member 102B, and the spring 104 are fitted to the guide rod 21B.

In the door mirror device 1 for the left door having the above-described configuration, the guide rod 21A, the detection rod 101A, the contact member 102A, and the variable resistor 103A are horizontal tilt angle detection members of the mirror unit 3. The guide rod 21B, the detection rod 101B, the contact member 102B, and the variable resistor 103B are vertical tilt angle detection members of the mirror unit 3. In the explanation below, when there is no need to distinguish specifically between the drive unit for horizontal tilting and the drive unit for vertical tilting, these are described as the guide rod 21, the detection rod 101, the contact member 102, and the variable resistor 103.

The detection rod 101 has a hollow cylindrical shape with the end being blocked, and the guide rod 21 is slidably inserted into the hollow portion. Consequently, the detection rod 101 is movably supported by the guide rod 21 along the axis thereof. A spherical head 106 is formed at the end of the detection rod 101.

The contact member 102 is slidably fitted to the guide rod 21 on the front side of the detection rod 101. The contact member 102 includes a ring 107 for inserting the guide rod 21 and a contact point 108 that protrudes radially outward from the ring 107, and is constituted so that the contact point 108 contacts with the variable resistor 103 and slides thereon. Moreover, the contact member 102 is pressed against the front end of the detection rod 101 by the spring 104 arranged outside of the guide rod 21. Consequently, the contact member 102 moves in the axial direction of the guide rod 21, following the movement of the detection rod 101.

When the contact member 102 moves in the axial direction of the guide rod 21, the contact point 108 slides on the variable resistor 103 in the longitudinal direction thereof, and a resistance value of the variable resistor 103 changes. The angle detection section 100 captures the tilt angle of the pivot plate 10 (that is, the tilt angle of the mirror 6) as an axial displacement of the detection rod 101, to detect the axial displacement of the detection rod 101 as a change in the resistance value of the variable resistor 103. That is to say, the angle detection section 100 calculates the tilt angle of the mirror 6 based on the resistance value of the variable resistor 103.

A plurality of locking protrusions 55 for locking the holder 9 are provided on the outer periphery of the peripheral walls 18 and 31 of the sensor housing 17 and the tilting drive section housing 28. The locking protrusions 55 are arranged at line-symmetric positions with respect to the virtual reference line S.

Bosses 57A and 57B for fixing the holder, are provided on the virtual reference line S between the gear positioning ribs 46 in the gear housing 35, and on the virtual reference line S between the guide rods 21 in the housing depressed portion 19 in the sensor housing 17. Moreover, bosses 57C and 57D for fixing the holder are provided on the base 27 outside of a connecting section between the sensor housing 17 and the tilting drive section housing 28. The bosses 57C and 57D are arranged at line-symmetric positions with respect to the virtual reference line S.

The holder 9 is placed on the sensor housing 17 and the tilting drive section housing 28 of the bracket body 13 and fixed thereto, thereby housing the mirror tilting drive section 11 and the angle detection section 100 between the bracket 8 and the holder 9.

The holder 9 has a line-symmetric shape with respect to a reference line corresponding to the virtual reference line S of the bracket 8 (hereinafter, referred to as a virtual reference line of the holder 9), and an external shape thereof as seen in plan view has a similar shape to a shape combining the sensor housing 17 and the tilting drive section housing 28.

As shown in FIG. 14, a fitting portion 63 is formed on the apical surface of a peripheral wall 62 of the holder 9. The fitting portion 63 is fitted to the fitting portions 20 and 33 of the peripheral walls 18 and 31 of the sensor housing 17 and the tilting drive section housing 28.

A hole 65 for inserting the operation shaft 44 and a hole 66 for inserting the detection rod 101 are formed at positions of the holder 9 corresponding to the operation shaft 44 and the detection rod 101. The end of the operation shaft 44 protrudes from the holder 9 through the hole 65, and the end of the detection rod 101 protrudes from the holder 9 through the hole 66. A grommet 67 is mounted between the hole 65 and the operation shaft 44, and a grommet 68 is mounted between the hole 66 and the detection rod 101.

Moreover, as shown in FIG. 12, the holder 9 includes a plurality of arms 73 that can be locked to the locking protrusions 55 of the sensor housing 17 and the tilting drive section housing 28 at portions corresponding to the locking protrusions 5. By locking the arms 73 to the locking protrusions 55, the holder 9 can be temporarily fixed to the sensor housing 17 and the tilting drive section housing 28 of the bracket body 13. The arms 73 are arranged at line symmetric positions with respect to the virtual reference line of the holder 9.

Furthermore, screw insertion holes 69 are provided at positions corresponding to the bosses 57A and 57B for fixing the holder of the bracket body 13. In FIG. 12, only the screw insertion hole 69 corresponding to the boss 57A is shown for convenience sake. The holder 9 also includes legs 70 extending so as to overlap on the bosses 57C and 57D for fixing the holder of the bracket body 13, and screw insertion holes 71 are provided in the legs 70. The legs 70 are also arranged at line-symmetric positions with respect to the virtual reference line of the holder 9. In FIG. 12, only the screw insertion hole 71 corresponding to the boss 57D is shown for convenience sake.

The holder 9 is fixed to the bracket body 13 by screwing four screws (not shown) passing through the screw insertion holes 69 and 71 into the bosses 57A to 57D of the bracket body 13.

As shown in FIG. 14, a pivot shaft 76 with an external surface thereof being formed by a part of a spherical surface, is integrally provided substantially in the middle of the rear surface of the holder 9 and on the virtual reference line of the holder 9. A virtual line connecting the center of the hole 65 for inserting the operation shaft 44A and the center of the hole 66 for inserting the detection rod 101A is a horizontal line passing through the center of the pivot shaft 76. A virtual line connecting the center of the hole 65 for inserting the operation shaft 44B and the center of the hole 66 for inserting the detection rod 101B is a vertical line passing through the center of the pivot shaft 76. The two virtual lines are arranged to be orthogonal to each other at the center of the pivot shaft 76.

Moreover, as shown in FIG. 12, the holder 9 includes U-shaped locking protrusions 77 protruding rearward from the rear surface of the holder 9 around the pivot shaft 76. The four locking protrusions 77 are arranged equidistance from the center of the pivot shaft 76 and are arranged with a spacing of 90 degrees about the pivot shaft 76, and arranged at line symmetric positions with respect to the virtual reference line of the holder 9. A virtual line connecting the centers of the left and right locking protrusions 77 becomes a horizontal line, and a virtual line connecting the centers of the upper and lower locking protrusions 77 becomes a vertical line.

The pivot plate 10 is fitted so as to be tiltable three-dimensionally, to the pivot shaft 76 of the holder 9.

The pivot plate 10 has a substantially rectangular shape as seen in plan view, and has a horizontally symmetrical shape. As shown in FIG. 14, a pivot depressed portion 80, into which the pivot shaft 76 of the holder 9 can be press-fitted, is provided at a predetermined position on the front surface of the pivot plate 10. An inner surface of the pivot depressed portion 80 is formed by a part of a spherical surface, and in a state with the pivot shaft 76 being press-fitted into the pivot depressed portion 80, the pivot plate 10 can pivot freely about a virtual center of the sphere of the pivot shaft 76 of the holder 9 as a pivot point. In the second embodiment, the pivot shaft 76 and the pivot depressed portion 80 constitute a pivot section.

As shown in FIG. 12, a spring housing depressed portion 82 having a substantially rectangular shape as seen in plan view is formed on the rear surface of the pivot plate 10 around a convex portion 81, which is a portion corresponding to the pivot depressed portion 80, and a substantially C-shaped spring 83 that engages with a base of the convex portion 81 is housed in the spring housing depressed portion 82. The spring 83 tightens the base of the convex portion 81 to prevent diameter expansion of the base. As a result, a situation where the pivot shaft 76 of the holder 9 is separated from the pivot depressed portion 80 can be prevented.

Moreover, the pivot plate 10 is provided with four rotation regulating pins 84 arranged with a spacing of 90 degrees on the outside of the spring housing depressed portion 82. The locking protrusions 77 of the holder 9 engage with the respective rotation regulating pins 84, and hence, a situation where the holder 9 and the pivot plate 10 rotate relative to each other around a longitudinal axis passing through the center of the pivot shaft 76 can be prevented.

As shown in FIG. 14, two spherical receptors in which the head 86 of the operation shaft 44 is fitted, and two spherical receptors in which the head 106 of the detection rod 101 is fitted are respectively provided on the front surface of the pivot plate 10. The head 86 of the operation shaft 44 and the head 106 of the detection rod 101 are formed in the same shape and the same size.

As shown in FIG. 12, spherical receptors 85A and 85B into which the heads 86 of the operation shafts 44A and 44B are fitted are provided on the left and lower sides of the convex portion 81 as seen from the rear surface of the pivot plate 10, and spherical receptors 85C and 85D into which the heads 106 of the detection rods 101A and 101B are fitted are provided on the right and upper sides of the convex portion 81 as seen from the rear surface of the pivot plate 10. These spherical receptors 85A to 85D are arranged at equidistant positions from the center of the pivot depressed portion 80, shifted by 90 degrees with respect to each other.

By fitting the heads 86 of the operation shafts 44A and 44B into the spherical receptors 85A and 85B, respectively, the operation shafts 44A and 44B and the pivot plate 10 are connected inseparably and integrally, while allowing sliding between the heads 86 and the spherical receptors 85A and 85B. The heads 86 of the operation shafts 44A and 44B and the spherical receptors 85A and 85B are fitted to each other so that relative rotation is not possible around the axis of the operation shafts 44A and 44B.

Furthermore, by fitting the heads 106 of the detection rods 101A and 101B into the spherical receptors 85C and 85D, respectively, the detection rods 101A and 101B and the pivot plate 10 are connected inseparably and integrally, while allowing sliding between the heads 106 and the spherical receptors 85C and 85D.

In a state with the pivot plate 10 mounted on the holder 9, the virtual line connecting both centers of the left and right spherical receptors 85A and 85C becomes the horizontal line, and the virtual line connecting both centers of the upper and lower spherical receptors 85D and 85C becomes the vertical line.

In the door mirror device 1 fitted to the left door for the front seat of the vehicle shown in FIG. 12, the heads 86 of the operation shafts 44A and 44B are fitted into the left and lower spherical receptors 85A and 85B of the four spherical receptors 85A, 85B, 85C, and 85D, and the heads 106 of the detection rods 101A and 101B are fitted into the right and upper spherical receptors 85C and 85D, as seen from the rear surface of the pivot plate 10. However, in the door mirror device 1 fitted to the right door for the front seat (not shown) of the vehicle shown in FIG. 15 and FIG. 16, the heads 86 of the operation shafts 44A and 44B are fitted into the right and lower spherical receptors 85C and 85B, and the heads 106 of the detection rods 101A and 101B are fitted into the left and upper spherical receptors 85A and 85D, as seen from the front surface of the pivot plate 10.

A mirror engaging portion 89 is provided at four corners of the pivot plate 10. The mirror engaging portion 89 includes a square hole 90 having a rectangular shape as seen in plan view, and a pin 91 spanning over the square hole 90 in the horizontal direction. An engaging claw (not shown) provided in the mirror holder 7 can be engaged with the pin 91, and by engaging the engaging claw with the pin 91, the mirror holder 7 is supported on the pivot plate 10.

In the door mirror device 1 having the above-described configuration, the operation shafts 44A and 44B are connected to the pivot plate 10 so as not to rotate about their own axes. Therefore, when a switch (not shown) near the driver's seat in the vehicle interior is operated to rotate the motor 40A and then the worm wheel gear rotating body 43A, the operation shaft 44A advances and retreats, and hence the pivot plate 10 can pivot horizontally. Likewise, when the motor 40B is rotated by operating the switch and the worm wheel gear rotating body 43B is rotated, the operation shaft 44B advances and retreats, and hence the pivot plate 10 can pivot vertically. As a result, a mirror unit 3 held by the pivot plate 10 can be tilted in an appropriate desired direction to view rearward.

Moreover, when the pivot plate 10 tilts horizontally, the detection rod 101A and the contact member 102A advances and retreats in the opposite direction of the movement of the operation shaft 44A, following the movement of the pivot plate 10. As a result, the resistance value of the variable resistor 103A changes. The horizontal tilt angle of the pivot plate 10, in other words, the horizontal tilt angle of the mirror 6 can be detected by detecting the resistance value.

Likewise, when the pivot plate 10 tilts vertically, the detection rod 101B and the contact member 102B advances and retreats in the opposite direction of the movement of the operation shaft 44B, following the movement of the pivot plate 10. As a result, the resistance value of the variable resistor 103B changes. The vertical tilt angle of the pivot plate 10, in other words, the vertical tilt angle of the mirror 6 can be detected by detecting the resistance value. The horizontal and vertical tilt angles can be stored in a storage unit (not shown).

In the door mirror device 1, the tilting drive section housing 28 and the sensor housing 17 are integrally formed with the bracket 8, and the mirror tilting drive section 11 is housed between the tilting drive section housing 28 and the holder 9. Moreover, the angle detection section 100 is stored between the sensor housing 17 and the holder 9. Consequently, the mirror tilting drive section and the angle detection section can be housed in a two-piece type case as in the conventional manner. As a result, the number of parts can be reduced by one, as compared with a case in which the mirror tilting drive section and the angle detection section are fitted to the bracket.

Moreover, the pivot plate 10 is connected to the holder 9 pivotably by press-fitting the pivot shaft 76 of the holder 9 into the pivot depressed portion 80 of the pivot plate 10. Consequently, a means (for example, a bolt) that disables disengagement of the holder 9 and the pivot plate 10 is not required as in the conventional case, and the number of parts can be reduced further.

As a result, cost reduction of the door mirror device 1 can be achieved.

Furthermore, the bracket 8 and the holder 9 can be assembled on the same assembly line, with the mirror tilting drive section 11 and the angle detection section 100 being housed therebetween. As a result, assembly can be simplified, thereby improving productivity.

Moreover, the two operation shafts 44A and 44B of the mirror tilting drive section 11 are arranged at line-symmetric positions with respect to the virtual reference line of the holder 9 that forms an elevation angle of 45 degrees with respect to the horizontal reference line H of the bracket 8 and passes the pivot point of the pivot plate 10. The two detection rods 101A and 101B of the angle detection section 100 are also arranged at line-symmetric positions with respect to the virtual reference line, and are distributed about the pivot point with a spacing of 90 degrees. Furthermore, fitting portions between the bracket 8 and the holder 9 (that is, the bosses 57A to 57D for fixing the holder of the bracket 8, the peripheral wall 31 of the tilting drive section housing 28, the peripheral wall 31 of the sensor housing 17, and the peripheral wall 31 of the holder 9) are arranged at line-symmetric positions with respect to the virtual reference line. Consequently, the holder 9 of the door mirror device 1 for the left door shown in FIG. 12 and the holder 9 of the door mirror device 1 for the right door shown in FIG. 15 can be shared by just shifting the fitting angle of the holder 9 with respect to the bracket 8 by 90 degrees. That is to say, the holder 9 can be a common part for the left and right door mirror devices.

Also in the second embodiment, a distance from the pivot point to the operation shafts 44A and 44B and a distance from the pivot point to the detection rods 101A and 101B are the same, and the shapes and sizes of the heads 86 of the operation shafts 44A and 44B and the heads 106 of the detection rods 101A and 101B are the same. The heads 86 of the operation shafts 44A and 44B and the heads 106 of the detection rods 101A and 101B can be fitted to any of the spherical receptors 85A to 85D of the pivot plate 10. Consequently, the pivot plate 10 of the door mirror device 1 for the left door shown in FIG. 12 and the pivot plate 10 of the door mirror device 1 for the right door shown in FIG. 15 can be shared.

Figure 16:
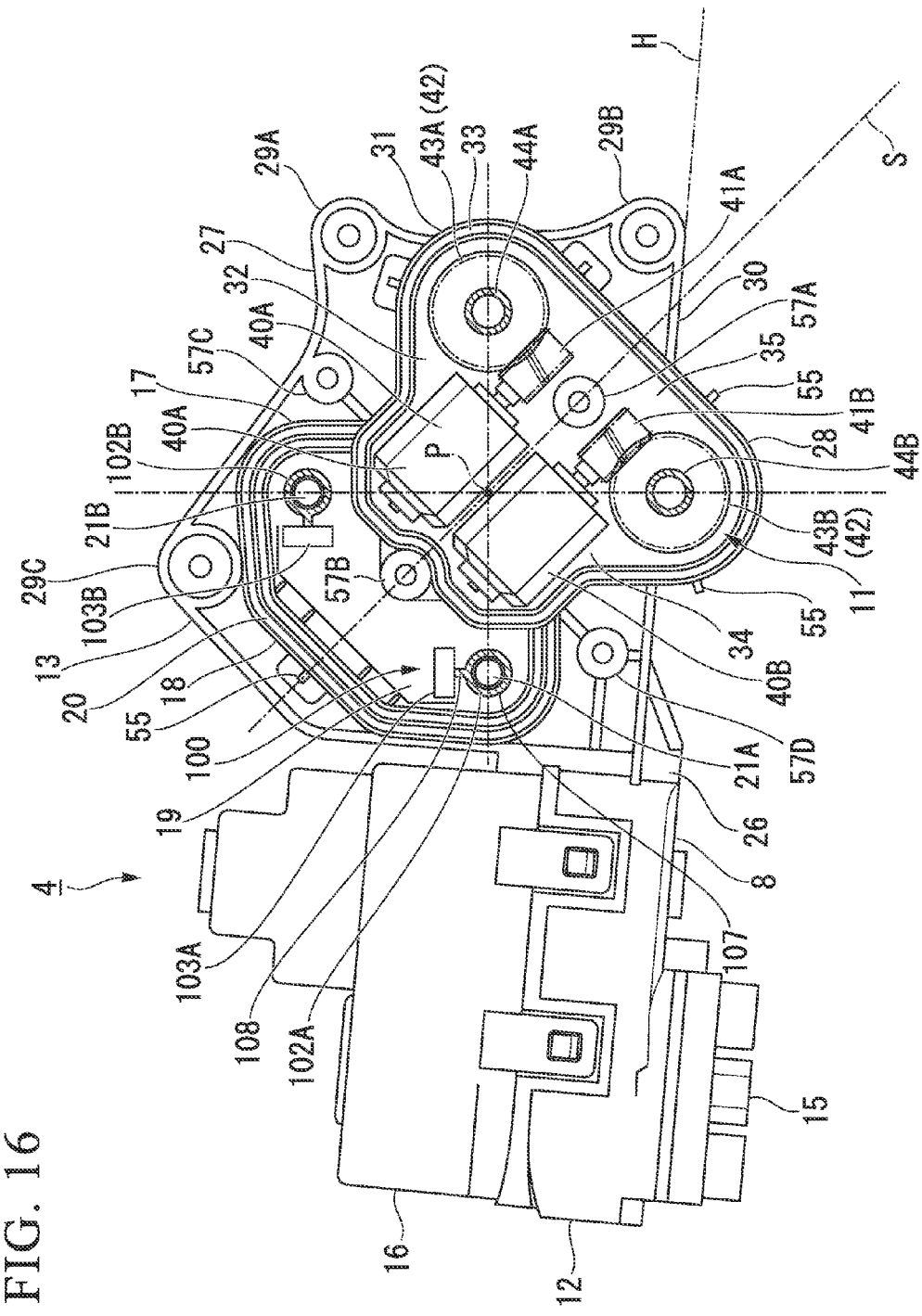
FIG. 16 is a front view of the drive unit in the door mirror device for the vehicle right door.

As is obvious from FIG. 13 and FIG. 16, the bracket 8 cannot be shared by the left and right doors. Hence a single-purpose bracket 8 is prepared for the door mirror device 1 for the left door and a single-purpose bracket 8 is prepared for the door mirror device 1 for the right door. The bracket 8 for the left door and the bracket 8 for the right door have the same configuration except for having a symmetrical shape to each other.

The holder 9 and the pivot plate 10 can be common parts for the left and right door mirror devices 1. As a result, parts management can be facilitated and productivity is improved.

Third Embodiment

Hereunder, a mirror surface angle adjusting device of a third embodiment according to the present invention will be explained, with reference to FIG. 1 to FIG. 11. Components similar to those in the first embodiment are denoted by the same reference symbols, and description thereof is omitted. The third embodiment is different from the first embodiment in that at the time of assembling the mirror surface angle adjusting device, misregistration of the mirror tilting drive section is prevented, and that positioning of the mirror tilting drive section with respect to the holder and with respect to the bracket can be performed simultaneously.

As shown in FIG. 7, in a gear housing 35, on the outside of an opening end 48a of each external cylindrical portion 48 there is provided a temporary positioning rib 49 formed of a plurality of circular-arc protrusions arranged concentrically with the external cylindrical portion 48. The temporary positioning rib 49 protrudes rearward from the opening end 48a of the external cylindrical portion 48.

Two worm wheel gear rotating bodies 43A and 43B are respectively arranged on the temporary positioning ribs 49 provided around the corresponding external cylindrical portions 48.

As shown in FIG. 10, a pivot plate 10 has a substantially rectangular shape as seen in plan view, and has a horizontally symmetrical shape. A pivot depressed portion 80, into which a pivot shaft 76 of a holder 9 can be press-fitted, is provided at a predetermined position on the front surface of the pivot plate 10. An inner surface of the pivot depressed portion 80 is formed by a part of a spherical surface. Moreover, in a state with the pivot shaft 76 being press-fitted into the pivot depressed portion 80, the pivot plate 10 can pivot freely about a virtual center of the sphere of the pivot shaft 76 of the holder 9 as a pivot point.

As shown in FIG. 6, a spring housing depressed portion 82 having a substantially rectangular shape as seen in plan view is formed on the rear surface of the pivot plate 10 around a convex portion 81, which is a portion corresponding to the pivot depressed portion 80. Moreover, a substantially C-shaped spring 83 that engages with a base of the convex portion 81 is housed in the spring housing depressed portion 82. The spring 83 tightens the base of the convex portion 81 to prevent diameter expansion of the base. Consequently, a situation where the pivot shaft 76 of the holder 9 is separated from the pivot depressed portion 80 can be prevented.

Moreover, the pivot plate 10 is provided with four rotation regulating pins 84 arranged with a spacing of 90 degrees on the outside of the spring housing depressed portion 82. Locking protrusions 77 of the holder 9 engage with the respective rotation regulating pins 84. Consequently, a situation where the holder 9 and the pivot plate 10 rotate relative to each other around a longitudinal axis passing through the center of the pivot shaft 76 can be prevented.

In the door mirror device 1, operation shafts 44A and 44B are connected to the pivot plate 10 so as not to rotate about their own axes. Therefore, when a switch (not shown) near the driver's seat in the vehicle interior is operated to rotate a motor 40A and then the worm wheel gear rotating body 43A, the operation shaft 44A advances and retreats, and hence the pivot plate 10 can pivot horizontally. Likewise, when a motor 40B is rotated by operating the switch and the worm wheel gear rotating body 43B is rotated, the operation shaft 44B advances and retreats, and hence the pivot plate 10 can pivot vertically. As a result, a mirror unit 3 held by the pivot plate 10 can be tilted in an appropriate desired direction to view rearward.

In the door mirror device 1, the housing 28 is integrally formed with the bracket 8, and the mirror tilting drive section 11 is housed between the housing 28 and the holder 9. Consequently, the number of parts can be reduced by one, as compared with a conventional case in which the mirror tilting drive section is housed in a two-piece type case and the case is fitted to the bracket.

Moreover, the pivot plate 10 is connected to the holder 9 pivotably by press-fitting the pivot shaft 76 of the holder 9 into the pivot depressed portion 80 of the pivot plate 10. Consequently, a means (for example, a bolt) that disables disengagement of the holder 9 and the pivot plate 10 is not required as in the conventional case, and the number of parts can be reduced further.

As a result, cost reduction of the door mirror device 1 can be achieved.

Moreover, the bracket 8 and the holder 9 can be assembled on the same assembly line, and a process of inverting the top and bottom can be omitted, thereby enabling to simplify the assembly. As a result, productivity is improved.

In the door mirror device 1 described above, motor positioning ribs 67 and 68 and gear positioning ribs 69 are provided on the inner wall of the holder 9. Therefore at the time of assembly, when the mirror tilting drive section is housed in the holder, the motors 40A and 40B and worm wheel gear rotating bodies 43A and 43B can be positioned at proper positions with respect to the holder 9, thereby enabling to prevent misregistration of the motors 40A and 40B and the worm wheel gear rotating bodies 43A and 43B during assembly. As a result, assemblability is improved.

Moreover, temporary positioning ribs 46 and 47 for the motors 40A and 40B and temporary positioning ribs 49 for the gear are provided on the inner wall of the housing 28 of the bracket 8. Therefore positioning of the motors 40A and 40B and the worm wheel gear rotating bodies 43A and 43B with respect to the bracket 8 can be performed simultaneously at the time of assembly.

INDUSTRIAL APPLICABILITY

According to the mirror surface angle adjusting device according to the present invention, the number of parts can be reduced, thereby enabling to achieve cost reduction. Moreover, assembly of the holder and the bracket can be performed on the same assembly line, thereby enabling to simplify assembly.

Furthermore, according to the mirror surface angle adjusting device according to the present invention, the holder can be made a common part for left and right door mirror devices, thereby facilitating parts management and improving productivity.

Moreover, according to the mirror surface angle adjusting device according to the present invention, the pivot plate can be made a common part for the left and right door mirror devices, thereby facilitating parts management and improving productivity.

Furthermore, according to the mirror surface angle adjusting device according to the present invention, assembly of the holder and the bracket and the pivot plate can be performed on the same assembly line, thereby enabling to simplify assembly. Moreover, during the assembly of the mirror surface angle adjusting device, misregistration of the mirror tilting drive section can be prevented, thereby enabling to improve assemblability.

Furthermore, according to the mirror surface angle adjusting device according to the present invention, positioning of the mirror tilting drive section with respect to the holder and positioning thereof with respect to the bracket can be performed simultaneously.

DESCRIPTION OF THE REFERENCE SYMBOLS

4: Drive unit (mirror surface angle adjusting device)
6: Mirror
8: Bracket
9: Holder
10: Pivot plate
11: Mirror tilting drive section
33: Fitting portion (attaching portion)
44: Operation shaft
46, 47: Temporary positioning rib
49: Temporary positioning rib
55: Locking protrusion (fitting portion)
57A to 57D: Boss (fitting portion)
63: Fitting portion (attaching portion)
67, 68: Motor positioning ribs
69: Gear positioning rib 73: Arm (attaching portion)
74: Leg (attaching portion)
76: Pivot shaft (pivot portion)
80: Pivot depressed portion (pivot portion)
100: Angle detection section
101A, 101B: Detection rod
H: Horizontal reference line
Sh: Virtual reference line

The invention claimed is:

1. A mirror surface angle adjusting device comprising:
a bracket which is attached to a vehicle body;
a holder which is attached to the bracket and which forms a housing space therebetween;
a pivot plate which supports a mirror, which is fitted to the holder to be capable of three-dimensionally pivoting on a pivot section, and the holder being attached to the bracket;
a mirror tilting drive section including a plurality of motors and gears which drives the mirror tilting drive section, which is contained between the bracket and the holder;
an operation shaft of the mirror tilting drive section which penetrates through the holder and which is connected to the pivot plate;
a pair of motor positioning ribs, including:
  a first motor positioning rib protruding from an inner wall of the holder and having a U-shaped portion configured to be fitted to an end on an output shaft side of the motors, and
  a second motor positioning rib protruding from the inner wall of the holder and having a U-shaped portion configured to be fitted to an end on an opposite side of the output shaft side of the motors,
  wherein the first motor positioning rib and the second motor positioning rib are aligned on a first direction;
a plurality of gear positioning ribs which is annular shaped and is provided on the inner wall of the holder in an area on an extension of the first direction at a side closer to the first motor positioning rib;
a pair of temporary motor positioning ribs protruding from an inner wall of the bracket and being aligned on a second direction which is perpendicular to the first direction; and
a plurality of temporary gear positioning ribs which is annular shaped and is provided on an inner wall of the bracket.

2. A mirror surface angle adjusting device according to claim 1, wherein the mirror tilting drive section includes two operation shafts, the holder includes a plurality of fitting portions for the bracket, and forms an elevation angle of about 45 degrees with respect to a horizontal reference line of the bracket, the two operation shafts of the mirror tilting drive section are arranged at line-symmetric positions to each other with respect to a virtual reference line passing through a pivot point formed by the pivot section, and the plurality of fitting portions are arranged at line-symmetric positions with respect to the virtual reference line.

3. A mirror surface angle adjusting device according to claim 2, wherein the holder includes a plurality of U-shaped locking protrusions protruding from the holder around the pivot shaft, and the pivot plate includes a plurality of rotation regulating pins which engage with the respective locking protrusions.

4. The mirror surface angle adjusting device of claim 1, further comprising:
a detection rod which is housed in the housing space, penetrates through the holder, is connected to the pivot plate, and moves following the pivot plate; and
an angle detection section which detects a tilt angle of the pivot plate, wherein the mirror tilting drive section is housed in the housing space.

5. A mirror surface angle adjusting device according to claim 4, wherein the mirror tilting drive section includes two operation shafts, the angle detection section includes two detection rods, and forms an elevation angle of about 45 degrees with respect to a horizontal reference line of the bracket, the two operation shafts of the mirror tilting drive section are arranged at line-symmetric positions to each other with respect to a virtual reference line passing through a pivot point formed by the pivot section, and two detection rods of the angle detection section are arranged at line-symmetric positions with respect to the virtual reference line.

6. A mirror surface angle adjusting device according to claim 5, wherein a distance of each of the operation shafts from the pivot center and a distance of each of the detection rods from the pivot center are the same.

7. A mirror surface angle adjusting device according to claim 6, wherein the holder includes a plurality of U-shaped locking protrusions protruding from the holder around the pivot shaft, and the pivot plate includes a plurality of rotation regulating pins which engage with the respective locking protrusions.

8. A mirror surface angle adjusting device according to claim 4, wherein the holder which is formed in one piece, and the bracket which is fitted to the holder, configure a housing space inbetween thereof, and the mirror tilting drive section and the angle detection section are housed in the housing space.

* * * * *